United States Patent
Tsutsui et al.

(10) Patent No.: US 7,337,459 B1
(45) Date of Patent: Feb. 26, 2008

(54) CONTROL METHOD AND CONTROL EQUIPMENT

(75) Inventors: Shintaro Tsutsui, Tokyo (JP); Susumu Nagano, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/743,166

(22) PCT Filed: May 8, 2000

(86) PCT No.: PCT/JP00/02933

§ 371 (c)(1),
(2), (4) Date: Mar. 20, 2001

(87) PCT Pub. No.: WO00/69176

PCT Pub. Date: Nov. 16, 2000

(30) Foreign Application Priority Data

May 7, 1999  (JP) ................ P11-127349

(51) Int. Cl.
*G06F 3/00* (2006.01)
(52) U.S. Cl. ............... 725/59; 725/80; 725/141
(58) Field of Classification Search ............ 715/762, 715/513, 839; 710/8; 719/321; 709/220–223; 455/13.1; 725/153, 141, 133, 59, 80
See application file for complete search history.

(56) References Cited

U.S. PATENT DOCUMENTS

| | | | |
|---|---|---|---|
| 5,317,693 A | 5/1994 | Cuenod et al. | |
| 5,655,148 A | 8/1997 | Richman et al. | |
| 5,764,930 A | 6/1998 | Staats et al. | |
| 5,793,366 A * | 8/1998 | Mano et al. ................ | 715/839 |
| 5,819,107 A * | 10/1998 | Lichtman et al. ............ | 710/8 |
| 6,041,364 A * | 3/2000 | Lortz et al. ................ | 719/321 |
| 6,182,094 B1 * | 1/2001 | Humpleman et al. ....... | 715/513 |
| 6,421,069 B1 * | 7/2002 | Ludtke et al. ............. | 715/762 |
| 6,529,707 B1 * | 3/2003 | Dent ........................ | 455/13.1 |
| 6,546,419 B1 * | 4/2003 | Humpleman et al. ....... | 709/223 |

FOREIGN PATENT DOCUMENTS

| | | |
|---|---|---|
| EP | 0 637 157 A2 | 2/1995 |
| WO | WO-98/16886 A1 | 4/1998 |
| WO | WO-98/17033 A1 | 4/1998 |

OTHER PUBLICATIONS

"Specification of the Home Audio/Video Interoperability (HAVI) Architecture", HAVI Specification, Nov. 1998, pp. 1-384.
Child, J., "Intelligent Home Technology Looks for Leverage from Related Markets", Computer Design, vol. 36, No. 12, Dec. 1997, pp. 85-87.

(Continued)

*Primary Examiner*—Hunter B. Lonsberry
(74) *Attorney, Agent, or Firm*—Lerner, David, Littenberg, Krumholz & Mentlik, LLP

(57) ABSTRACT

In order to easily download a program obtained from the outside onto a connected device while a device on which a program is to be downloaded is being properly selected, when a second device connected to a first device is controlled by executing a first program inputted to the first device from the outside and a second program prepared beforehand in the first device, the most desirable device is selected as the second device by executing the second program and the first program is executed by using information on the selected device.

42 Claims, 15 Drawing Sheets

OTHER PUBLICATIONS

Banks, D. et al., "Breaking Open the Set Top Box", Proceedings of the SPIE, vol. 3228, Nov. 4, 1997, pp. 105-116.

"AV/C Digital Interface Command Set General Specification", 1394 Trade Association, Apr. 15, 1998, pp. 1-88.

* cited by examiner

CONTROL METHOD AND CONTROL EQUIPMENT

TECHNICAL FIELD

The present invention relates to a control method and a control equipment suitable for use in receiving digital satellite broadcasting and downloading a received music program or the like onto a data storage equipment, for example.

BACKGROUND ART

Digital satellite broadcasting is being widely used increasingly. As compared with existing analog broadcasting, digital satellite broadcasting is resistant to noise and fading and is able to transmit a high-quality signal. Digital satellite broadcasting can also increase frequency utilization factor and can provide multiple channels. For example, in the digital satellite broadcasting, one satellite can secure several hundreds of channels. The digital satellite broadcasting prepares a large number of special channels such as a sports program, a movie, music and a news program, and these special channels are broadcasting the programs of their own contents.

Of these special channels, a music program channel is one of the popular channels of the digital satellite broadcasting and is broadcasting promotion programs mainly introducing new songs and hit songs.

The conventional music channel is broadcasting the music promotion programs introducing new songs and hit songs in the form of moving pictures and sounds. Listeners are often urged to purchase a CD with introduced numbers and wish to listen to such numbers while viewing the music promotion programs. Listeners often want to know information about artists in the desired numbers and information about an album of desired numbers. While listeners are viewing music channel programs and wish to get the information about the artist of desired number and the information about the album of such desired numbers, it would have been very convenient for the listeners if they could get such information on the spot. When the listeners found favorite numbers, it would have been very convenient if they could download audio data of such desired numbers. The conventional music channel is, however, unable to meet such listeners requests because it is usually transmitting moving pictures and sounds concerning numbers to the listeners one-sidedly.

To solve the above problem, there is proposed a music contents distribution system capable of easily obtaining information concerning music broadcast on the music channel and which is also able to easily download number data to a data storage equipment (Japanese patent application No. 9-308488 (1997)). Some proposed music contents distribution system is able to download words data and jacket data as well as the music data.

When a user sets up the music contents distribution system, the user who receives digital satellite broadcasting should connect a tuner for receiving digital satellite broadcasting to a data storage equipment (recording equipment) using a recording medium such as a magnetooptical disk to download a music program received at the tuner onto the recording equipment. When the music program received at the tuner is downloaded onto the recording equipment, the recording operation of the recording equipment connected to the tuner should be controlled based on data such as a start time of the corresponding program transmitted together with the music program, for example, by the digital satellite broadcasting, and hence the tuner and the recording equipment should be set in such a manner that they can operate in unison with each other. There are known various types of the recording equipment for recording an audio signal, for example, and hence an unspecified recording equipment, which will be connected to the tuner, cannot directly be controlled substantially based on data from a broadcast station from which music program is transmitted.

Only one recording equipment is not always connected to the tuner, and a plurality of recording equipment may be connected to the tuner. In that case, the broadcast station is unable to select a specific recording equipment to which a music program should be downloaded, and hence the tuner has to explore some countermeasures to select a specific recording equipment.

In order to make the above download become possible, the assignee of the present application has previously proposed a control equipment in which a program (HTML (Hyper Text Make-Up Language), MHEG (Multimedia and Hypermedia Information Coding Experts Group), XML (extensive Markup Language) called scripts) from the outside obtains device information from an internal program previously-prepared in the tuner and is able to instruct the tuner to select a specific device onto which the broadcast music program should be downloaded based on the device information (Japanese patent application No. 10-202360 (1998)).

The processing proposed by the previously-proposed application encounters with the problem that, when the user energizes the tuner to start the download first time, the tuner is unable to determine which device is the recording equipment onto which the music program should be downloaded. A device that has been selected as the recording device to which the music program should be downloaded is referred to as a "default device".

While the default device is not existing, e.g., downloading is effected on the recording equipment for the first time, the external program should execute the sequence to request the internal program to obtain information of devices currently connected to the tuner, to display a list of connected devices and to request a user to select a specific device onto which music program should be downloaded.

Even when the tuner stored the previously-obtained information of the device in a predetermined memory within a control section (CPU), if the corresponding device is not connected to the tuner in the next download (e.g., if a user purchases a new device on which data should be downloaded and changes the previous device), then the tuner has to again obtain information of currently connected devices, to display a list of those connected devices and to urge the user to again select one device that should be used.

In the previously-proposed download, the download is effected on the device on which the download has been effected previously. Depending on the state of the device onto which data should be downloaded (whether the device has already been powered or a recording media has already been inserted into the device), after processing for executing the download has started, when a recording media is not inserted into the device, an abnormality occurs in the download and the download is often ended in somewhere of its processing. There is then the possibility that the tuner will become unable to select a proper device as a default device. Hence, the tuner has to make some device to solve this problem.

When a tuner can be connected to various networks (e.g., IEEE (The Institute of Electrical and Electronics Engineers) 1394 system, USB (Universal Serial Bus), etc.), unless the user makes complicated input operation to specify a device, the user becomes unable to specify a download target device connected to a specific network. Consequently, operation for the download becomes considerably cumbersome for the user.

While the problem arising when the music program is transmitted through the digital satellite broadcast has been described so far, a similar problem arises when various programs transmitted from the outside by broadcast waves are downloaded onto the receiving side based on data transmitted together with those programs.

DISCLOSURE OF INVENTION

It is an object of the present invention to provide a control method and a control equipment in which a program obtained from the outside can easily be downloaded onto a connected device after a device to which a program should be downloaded has properly be selected.

According to the first invention, there is provided a control method in which a second device connected to a first device is controlled by executing a first program inputted to the first device from the outside and a second program prepared beforehand in the first device.

The most desirable device is selected from devices connected to the first device as the second device by executing the second program, and the first program is executed by using information of the selected device. With this arrangement, when an external program, for example, requests an internal program to obtain default device information, even if a default device ID is not stored in a predetermined memory, then information of a currently-connected device can be obtained by returning information of the most desirable device of the connected devices and a list of connected devices can be displayed. Consequently, a user can save a lot of time and labor required when the user selects a target device in a target network from the list of connected devices, and hence the user can download data more easily and efficiently.

According to the second invention, in the control method according to the first invention, the second device is selected when information concerning the second device is not stored in a connected device information storage section of the first device. With this arrangement, even when the default device is not selected, an optimum device can automatically be selected.

According to the third invention, in the control method according to the first invention, the second device is selected when a device instructed by information stored in the connected device information storage section of the first device is not connected. With this arrangement, when a device that has already been selected as a default device is disconnected from the network, an optimum device can automatically be selected from other devices within the network.

According to the fourth invention, in the control method according to the first invention, device information used at every type of device is stored in the connected device information storage section, the first or second program includes processing for selecting the type of device and when a device of the type instructed by the program should be selected, the most desirable device is selected as the second device. With this arrangement, when various types of devices are controlled, device information need not be obtained, and hence the user can download data more easily and efficiently.

According to the fifth invention, in the control method according to the first invention, the information obtained when the second program is executed is information of an identification code granted to the second device. With this arrangement, the first device side can discriminate the type of the second device, and the second device can properly be controlled based on the discriminated identification code.

According to the sixth invention, in the control method according to the first invention, the second program is a program for effecting processing on the second device connected through a bus line of a predetermined format. With this arrangement, control corresponding to the format of the bus line connecting the first and second devices becomes possible.

According to the seventh invention, in the control method according to the first invention, the second program is a program for setting information concerning the second device by predetermined input operation. With this arrangement, the control method can cope with a second device incapable of transmitting its own information.

According to the eighth invention, in the control method according to the first invention, the first program is obtained by receiving a signal transmitted from a broadcast signal transmission side through predetermined broadcast waves. With this arrangement, when the broadcast signal transmitting side, for example, transmits a first program for instructing downloading of a broadcasting program of a predetermined channel, the side which receives this program can obtain information of a connected device by a second program activated by the first program, can effect a proper download on the device and can download an arbitrary broadcasting program in response to an instruction from the broadcast signal transmitting side.

According to the ninth invention, in the control method according to the first invention, the first program is obtained by receiving a signal transmitted through wired broadcast. With this arrangement, an arbitrary broadcast program can be downloaded in response to an instruction from the wired broadcast transmitting side.

According to the tenth invention, there is provided a control method in which a second device connected to a first device is controlled by executing a first program inputted into the first device from the outside and a second program prepared beforehand in the first device. When an abnormality occurs in control of the second device and the control is ended, information concerning the second device is stored in a predetermined storage section of the first device. Next time a device controlled by the first device is selected, the second device is controlled based on information stored in the storage section. With this arrangement, while an external program, for example, requests of an internal program to make the download, even when an abnormality occurs in a media inserted into a download target device and the internal program ends abnormally, if an ID of such device is stored, a user removes the abnormality and uses the device having the stored ID as the default device, then the user need not select the default device again and the user can download data more easily and efficiently.

According to the eleventh invention, there is provided a control equipment which is comprised of a first storage section in which a first program inputted from the outside is stored, a second storage section in which a second program prepared beforehand and which is activated by the first program is stored, and a processing section in which programs stored in the respective storage sections are executed, after the most desirable device was selected from connected devices by executing the second program stored in the second storage section, information of the selected device is obtained and the connected device is controlled based on the obtained information. With this arrangement, when an external program requests of an internal program to obtain default device information, even if default device ID is not stored in a predetermined memory, then information of currently-connected device can be obtained by returning information of the most desirable device from the connected devices, a list of the connected devices can be displayed and the user can save a lot of time and labor to select a desired device in a desired network from the displayed list of the connected devices. Accordingly, there is obtained a network device in which the user can download data more easily and efficiently.

According to the twelfth invention, in the control equipment according to the eleventh invention, the processing section selects the most desirable device from the connected devices when information of controlled devices is not stored in the second storage section. With this arrangement, even when a default device is not selected, the optimum device can automatically be selected.

According to the thirteenth invention, in the control equipment according to the eleventh invention, the processing section selects the most desirable device from other connected devices when the device stored in the second storage section is not connected as the controlled device. With this arrangement, when the device that had already been selected as the default device is disconnected from the network, the optimum device can automatically be selected from other devices within the network.

According to the fourteenth invention, in the control equipment according to the eleventh invention, device information used at every type of device is stored in the second storage section and the processing section selects the most desirable device from the type when the device of the type instructed by the first or second program should be selected. With this arrangement, when various types of devices are controlled, device information need not be obtained, and the user can download data more easily and efficiently.

According to the fifteenth invention, in the control equipment according to the eleventh invention, information that the processing section obtains from the device by executing the second program is information of identification code granted to the device. With this arrangement, the control equipment can discriminate the type of the connected device and the connected device can properly be controlled based the discriminated identification code.

According to the sixteenth invention, the control equipment according to the eleventh invention includes an interface section for communicating with a device through a bus line of a predetermined format and in which the processing section obtains information of the connected device by communication through the interface section and the connected device can be controlled by communication through the interface section. With this arrangement, devices connected by a bus line such as an IEEE 1394 bus, for example, can be controlled satisfactorily.

According to the seventeenth invention, the control equipment according to the eleventh invention includes an input section for inputting information concerning devices and a remote control signal output section for outputting a remote control signal of a predetermined format in response to a command from the processing section and in which the input section obtains information of the connected device when information concerning device is inputted and the processing section enables the remote control signal output section to output a remote control signal based on the obtained information. With this arrangement, even when a device incapable of transmitting its own information is connected, this device can be controlled satisfactorily.

According to the eighteenth invention, the control equipment according to the eleventh invention includes a receiving section for receiving a broadcast signal of a predetermined format and in which a first program contained in the received broadcast signal is stored in the first storage section. With this arrangement, when a broadcast signal transmitting side, for example, transmits the first program instructing the download of a broadcast program of a predetermined channel, the control equipment which received this program obtains information of a connected device by the second program activated by the first program and the proper download processing on the device can be executed satisfactorily and an arbitrary broadcast program can properly be downloaded onto the device connected to the control equipment by the instruction from the broadcast signal transmitting side.

According to the nineteenth invention, in the control equipment according to the eighteenth invention, the receiving section is a receiving section for receiving a satellite broadcast signal relayed by a predetermined artificial satellite. With this arrangement, a broadcast program transmitted by the satellite broadcast signal can be downloaded satisfactorily.

According to the twentieth invention, in the control equipment according to the eighteenth invention, the receiving section is a receiving section for receiving a signal transmitted through a wired broadcast. With this arrangement, a broadcast program transmitted via the wired broadcast can be downloaded satisfactorily.

In accordance with the twenty-first invention, there is provided a control equipment which is comprised of a first storage section in which a first program inputted from the outside is stored, a second storage section in which a second program prepared beforehand and which is activated by the first program is stored and a processing section in which the programs stored in the respective storage sections are executed, information of connected device is obtained based on execution of the second program stored in the second storage section, the connected device is controlled based on the obtained information, when an abnormality occurs in the control and the control is ended, the controlled device is selected in the next control. With this arrangement, while an external program, for example, requests of an internal program to make downloading, even when an abnormality occurs in a media inserted into a download target device and the internal program ends abnormally, if an ID of such device is stored, a user removes the abnormality and uses the device having the stored ID as the default device, the user need not select the default device again, and the user can download data more easily and efficiently.

BEST MODE FOR CARRYING OUT THE INVENTION

Embodiments of the present invention will be described below with reference to the accompanying drawings.

The system according to the present invention broadcasts a music program by using digital satellite broadcasting, enables the viewers to listen to the music program by distributing audio data relating to this music program and further enables the viewers to easily purchase favorite numbers on the spot if any.

Figure 1:
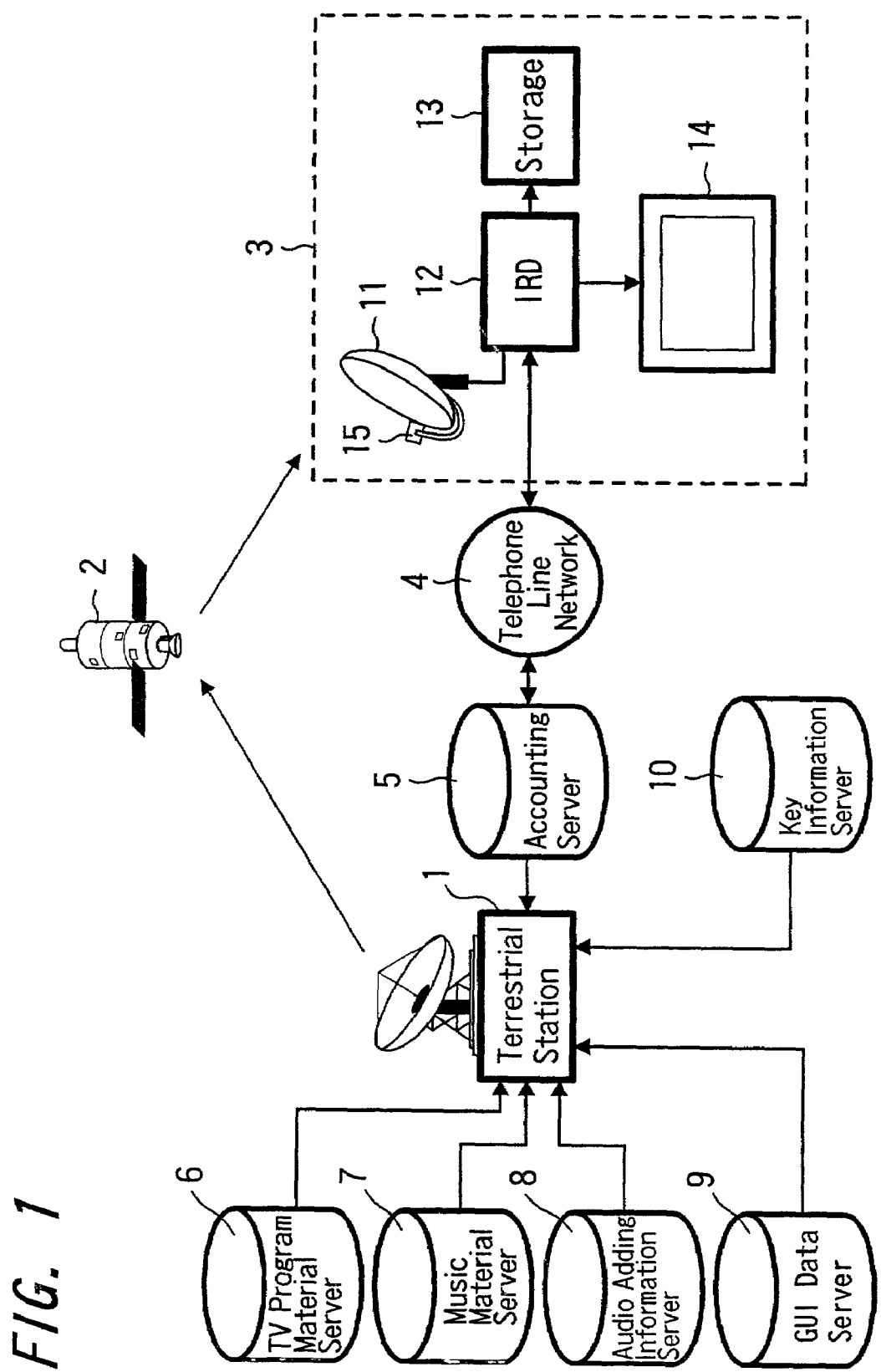
FIG. 1 is a block diagram showing an example of an arrangement of the whole of the system according to an embodiment of the present invention.

FIG. 1 shows an overall arrangement of a music contents distribution system to which the present invention is applied. As illustrated, a terrestrial station 1 for digital satellite broadcasting receives television program broadcast material from a television program material server 6, music data material from a tune material server 7, audio adding information from an audio adding information server 8 and GUI data from a GUI (Graphical User Interface: Graphical User Interface) data server 9.

The television program server 6 provides materials of ordinary music broadcasting programs. Materials of music program transmitted from the television program material server 6 are moving pictures and sounds. In the ordinary music broadcasting program, promotion moving pictures and sounds to introduce new music are broadcast or a countdown of latest hit songs is broadcast.

The tune material server 7 provides an audio program by using an audio channel. A material of the audio program is only sounds. The tune material server 7 transmits materials of audio programs of a plurality of audio channels to the terrestrial station 1. In the program broadcasting of each channel, the same tune is repeatedly broadcast during a predetermined time unit. Respective audio channels are independent and may be used variously. For example, one audio channel may broadcast a recommended number of latest Japanese popular songs repeatedly during a predetermined time. Other audio channel may broadcast a recommended number of latest American popular songs repeatedly during a predetermined time, and a further audio channel may broadcast a recommended number of Jazz repeatedly during a predetermined time. Moreover, a plurality of tunes by the same artist may be repeatedly broadcast from respective audio channels.

The audio adding information server 8 provides time information of tune outputted from the tune material server 7.

The GUI data server 9 provides data used to produce pictures of a list page of distributed tune and of information page of each tune, data used to produce still picture data of a jacket, data used to produce a picture for an EPG (Electric Program Guide) or the like. As will be described in detail later on, according to the system to which the present invention is applied, a user is able to display the words of the distributed tune, concert information of artists, or the like on the screen by operating GUI on the screen. The user can select, download and reserve the download of music by operating GUI on the screen. The GUI data server 9 transmits data used therefor. GUI data according to this embodiment is data with a format standardized by MHEG (Multimedia and Hypermedia Information Coding Experts Group), for example.

The terrestrial station 1 multiplexes video data and audio data serving as materials of the music program broadcasting from the television program material server 6, audio data serving as materials of audio channels from the tune material server 7 and GUI data from the GUI data server 9 and transmits multiplexed data. The video data of the television program broadcasting is compressed by an MPEG (Moving Picture Experts Group) 2 system, and the audio data of the television program broadcasting is compressed by an MPEG2 audio system, for example. Audio data of each audio channel is compressed by two different systems, e.g., the MPEG2 audio system and an ATRAC (Adaptive Transform Acoustic Coding) system. When these data are multiplexed, they are encrypted by using key information from a key information server 10.

A signal from the terrestrial station 1 is received through an artificial satellite 2 by receiving equipment 3 installed on each home. A plurality of transponders are mounted on the satellite 2. One transponder has a transmission capability of 30 Mbps, for example. As the receiving equipment 3 installed on each home, there are prepared a parabolic antenna 11, an IRD (Integrated Receiver Decoder) 12 which is a receiver to receive and decode a digital satellite broadcast, a storage device 13 for storing received data and a television receiver 14.

A signal transmitted through the satellite 2 is received at the parabolic antenna 11. The received signal is converted into a predetermined frequency by an LNB (Low Noise Block Downconverter) 15 attached to the parabolic antenna 11 and supplied to the IRD 12.

The IRD 12 selects a predetermined channel signal from the received signal and demodulates video data and audio data. The IRD 12 produces also pictures for list pages of distributed music, pictures for information pages of each music and pictures for GUI. An output from the IRD 12 is supplied to the television receiver 14.

The storage device 13 stores therein downloaded audio data. For example, as the storage device 13, there can be used an MD recorder/player using a magnetooptical disk called an MD (mini disc) as a recording medium, a DAT recorder/player using a magnetic tape as a recording medium, a DVD recorder/player using a video recording optical disk as a recording medium, etc. A personal computer also can be used as the storage device 13 and the personal computer can store audio data in a medium such as a hard disk, a CD-R, a CD-RW and a memory card.

The IRD 12 is connected through a telephone line network 4, for example, to an accounting server 5. An IC card with various information stored therein is inserted into the IRD 12. When audio data of music is downloaded, information of downloading is memorized in the IC card. The information in this IC card is transmitted through the telephone line network 4 to the accounting server 5. The accounting server 5 properly accounts for viewers based on the download information. A copyright of a tune to be downloaded can be protected by this proper accounting.

In this manner, in the system according to this embodiment, the terrestrial station 1 multiplexes video data and audio data serving as material of music program broadcast from the television program material server 6, audio data serving as material of audio channel from the music material server 7, audio adding information data from the audio adding information server 8 and GUI data from the GUI data server 9 and transmits the data thus multiplexed. While the receiving equipment 3 at each home receives this broadcasting, the viewer can watch the music program and the GUI picture is displayed based on the GUI data thus transmitted. When the viewer is doing necessary operation while watching the GUI picture, the viewer can watch information page about each music and can listen to each music on trial. While the viewer is doing necessary operation while watching the GUI picture, the viewer can download audio data of a desired number and store the downloaded audio data in the storage disk 13.

Next, operation done by the viewer at the receiving equipment 3 installed at each home will be described more in detail.

Figure 2:
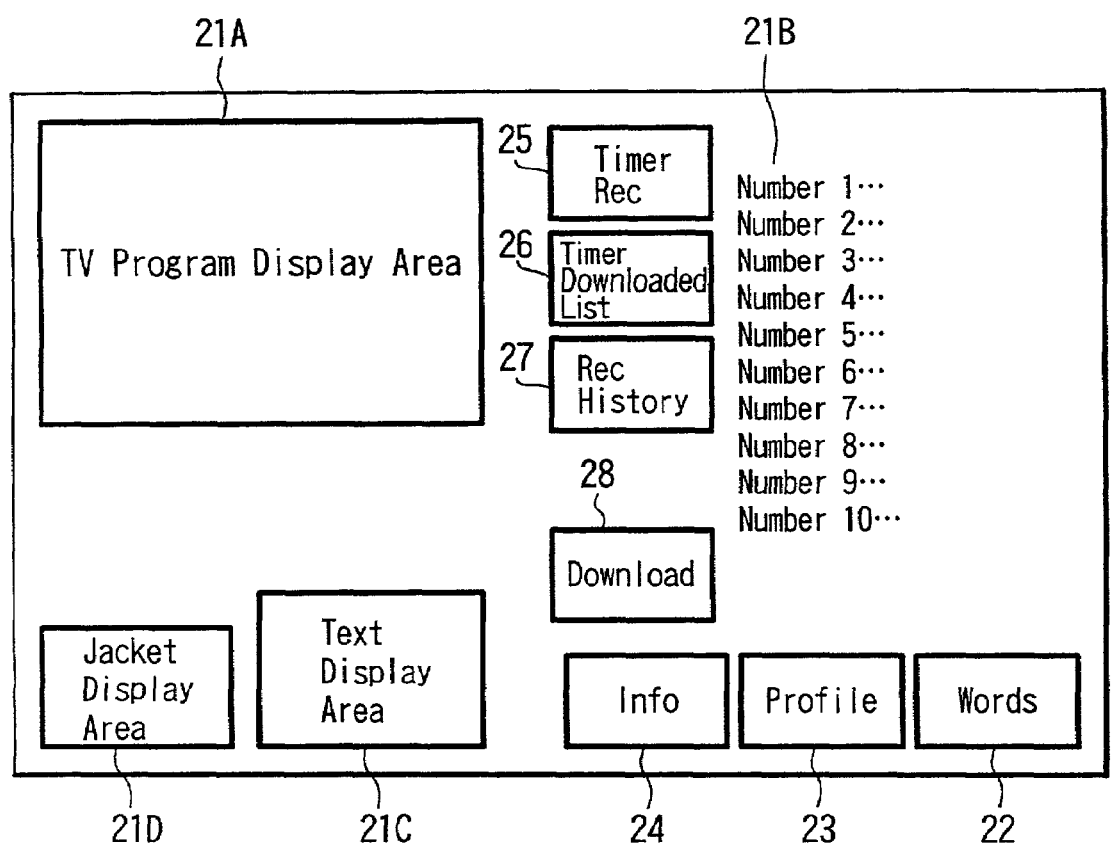
FIG. 2 is an explanatory diagram showing an example of a picture received and reproduced on a screen according to an embodiment of the present invention.

When this broadcasting is received by the receiving equipment 3 at each home, a picture shown in FIG. 2 is displayed on the television receiver 14. A television program display area 21A on the upper left of the screen displays a moving picture based on the music program supplied from the television program material server 6. A list 21B of tunes of respective channels broadcast on the audio channels is displayed on the upper right of the screen. A text display area 21C and a jacket display area 21D are set to the lower left of the screen. Further, a words display button 22, a profile display button 23, an information display button 24, a timer-activated recording button 25, a timer-activated recording list display button 26, a recording history display button 27 and a download button 28 are displayed on the right-hand side of the screen.

While watching titles of tunes displayed on the list 21B, the viewer is looking for interesting music. Having found out the interesting music, placing a cursor on the interesting tune by operating arrow keys on a remote commander and pressing the enter key on the remote commander attached to the IRD 12, the viewer can listen to the music pointed by the cursor. Specifically, since each audio channel is repeatedly broadcasting the same music during a predetermined unit time, while the same picture is being displayed on the television program display area 21A, the audio channel is switched to the audio channel of the interesting music, and hence the viewer is able to listen to the interesting music. At that time, the jacket display area 21D displays a still picture of an MD jacket of the interesting music.

In this state, when the viewer puts the cursor on the words display button 22 and presses the enter key (operation in which the viewer puts the cursor on the button and presses the enter key will hereinafter be referred to as "press button"), the text display area 21C displays the words of the interesting music at the right time synchronized with audio data. Similarly, when the viewer presses the profile display button 23 or the information display button 24, the text display area 21C displays a profile of an artist corresponding to music or concert information, etc. In this manner, the viewer is able to know pieces currently distributed and can get detailed information about each piece.

When the viewer wants to purchase the music that the viewer has so far listened to on trial, the viewer presses the download button 28. When the user presses the download button 28, audio data of the selected music is downloaded and stored in the storage device 13. The viewer can download words data, profile information of artist, still picture data of jacket, etc. together with audio data of music. Each time music is downloaded, information of the download is stored in the IC card within the IRD 12. Information stored in the IC card are supplied to the accounting server 5 once per month, and hence a copyright of music to be downloaded can be protected.

When the viewer wants to make a timer-activated downloading in advance, the viewer presses the timer-activated recording button 25. When the viewer presses this button, the GUI picture is switched and a list of music that can be downloaded in a timer-activated fashion is displayed on the whole of the screen. This list can display music that had been searched at the unit of one hour, at the unit of one week, at the unit of genre, etc. When the viewer selects desired music that should be timer-activated-downloaded from this list, information of such desired music is registered within the IRD 12. When the viewer wants to confirm music that had already been timer-activated for the download, the viewer can display the list of timer-activated-downloading music on the whole of the screen by pressing the timer-activated downloading list display button 26. The music thus timer-activated for the download is downloaded at a timer-activated time by the IRD 12 and stored in the storage device 13.

When the viewer wants to confirm music that had already been downloaded, the viewer can display the list of downloaded music on the whole of the screen by pressing the timer-activated recording history button 27.

In this manner, in the receiving equipment 3 of the system according to this embodiment, the list of music is displayed on the GUI picture of the television receiver 14. While the viewer is selecting music in accordance with the display on the GUI picture, the viewer can listen to the selected music on trial and can learn the words of such music, a profile of artist, etc. Further, the viewer can download the music, timer-activate-download the music and display the list of downloaded music, the list of timer-activated-downloading music, etc.

As described above, the music contents distribution system according to the present invention can distribute the music broadcast programs and can also distribute audio data of music by using a plurality of audio channels. The viewer can search desired music by using a list of distributed music, or the like and can easily store audio data in the storage device 13. This system will further be described below more fully.

Figure 3:
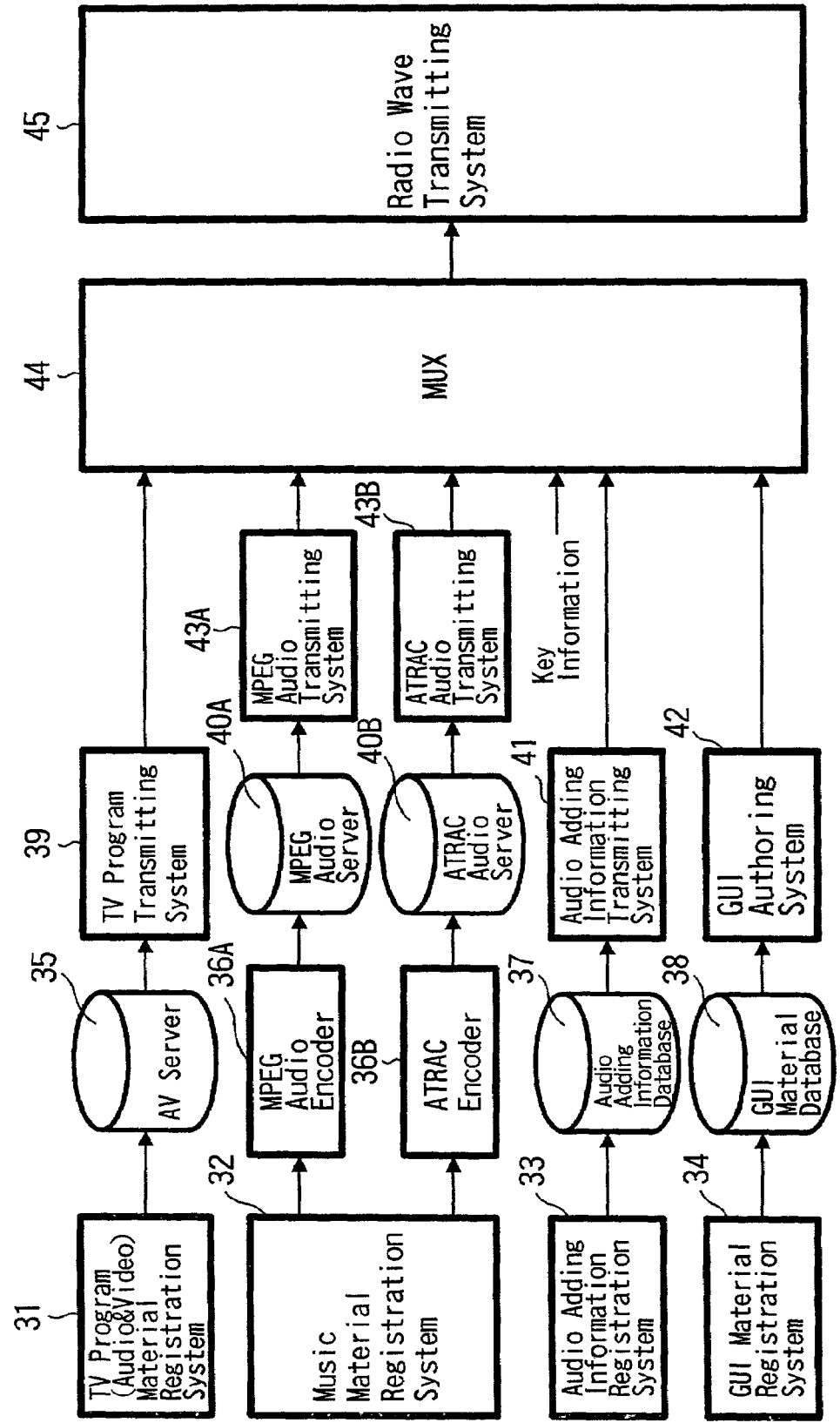
FIG. 3 is a block diagram showing an example of an arrangement of a data transmitting side according to an embodiment of the present invention.

FIG. 3 shows the arrangement of the terrestrial station 1 in the music contents distribution system according to this embodiment.

As shown in FIG. 3, material data from a television program material registration system 31 is registered on an AV server 35. The material data comprises video data and audio data. The data registered on the AV server 35 is transmitted to a television program transmitting system 39, in which video data is compressed by the MPEG2 system, for example, and audio data is compressed by the MPEG2 audio system, for example, and thereby converted into packets. The output from the television program transmission system 39 is transmitted to a multiplexer 44.

Audio data from a tune material registration system 32 is supplied to an MPEG2 audio encoder 36A and an ATRAC encoder 36B, in which it is encoded, respectively, and registered on an MPEG audio server 40A and an ATRAC audio server 40B. MPEG audio data registered on the MPEG audio server 40A is transmitted to an MPEG audio transmitting system 43A, in which it is converted into packets and sent to the multiplexer 44. ATRAC data registered on the ATRAC audio server 40B is transmitted to an ATRAC audio transmitting system 43B as four-times normal speed ATRAC data, in which it is converted into packets and transmitted to the multiplexer 44.

Audio adding information from an audio adding information registration system 33 is registered on an audio adding information database 37. The audio adding information registered on the audio adding information database 37 is transmitted to an audio adding information transmitting system 41, in which it is converted into packets and transmitted to the multiplexer 44.

GUI data from the GUI material registration system 34 is registered on a GUI material database 38. The GUI material data registered on the GUI material database 38 is transmitted to a GUI authoring system 42, in which GUI picture data is processed, converted into packets and transmitted to the multiplexer 44. The GUI material data contains still picture information of jacket, words information of tune, concert information of artist, etc. The still picture information is text data within 640×480 pixels and the words information is text data within 800 characters, for example, compressed by JPEG (Joint Photographic Experts Group) system and respectively converted into packets.

The multiplexer 44 multiplexes in timebase video packets and audio packets from the television program transmitting system 39, audio packets from the MPEG audio transmitting system 43A, four-times normal speed audio packets from the ATRAC audio transmitting system 43B, audio adding information packets from the audio adding information transmitting system 41 and GUI data packets from the GUI authoring system 42 and also encrypts them by using key information from the key information server 10 (FIG. 1).

An output from the multiplexer 44 is supplied to a radio wave transmitting system 45, in which it is added with error-correcting codes, modulated and frequency-converted, and transmitted from the antenna to the satellite 2.

FIGS. 4A to 4I show examples of data transmitted from the terrestrial station 1. Respective data shown in the figures are time-base-multiplexed in actual practice. As shown in FIG. 4, a time period between a time t1 and a time t2 makes one event and the next event starts from the time t2. The event is a unit used to change a lineup of music, and it is customary that one event is shown by 30 minutes or one hour. For example, of top 20 of latest hit songs, hit songs from 20th place to 11th place may be broadcast during the preceding event and hit songs from 10th place to 1st place may be broadcast during the succeeding event.

Figure 4:
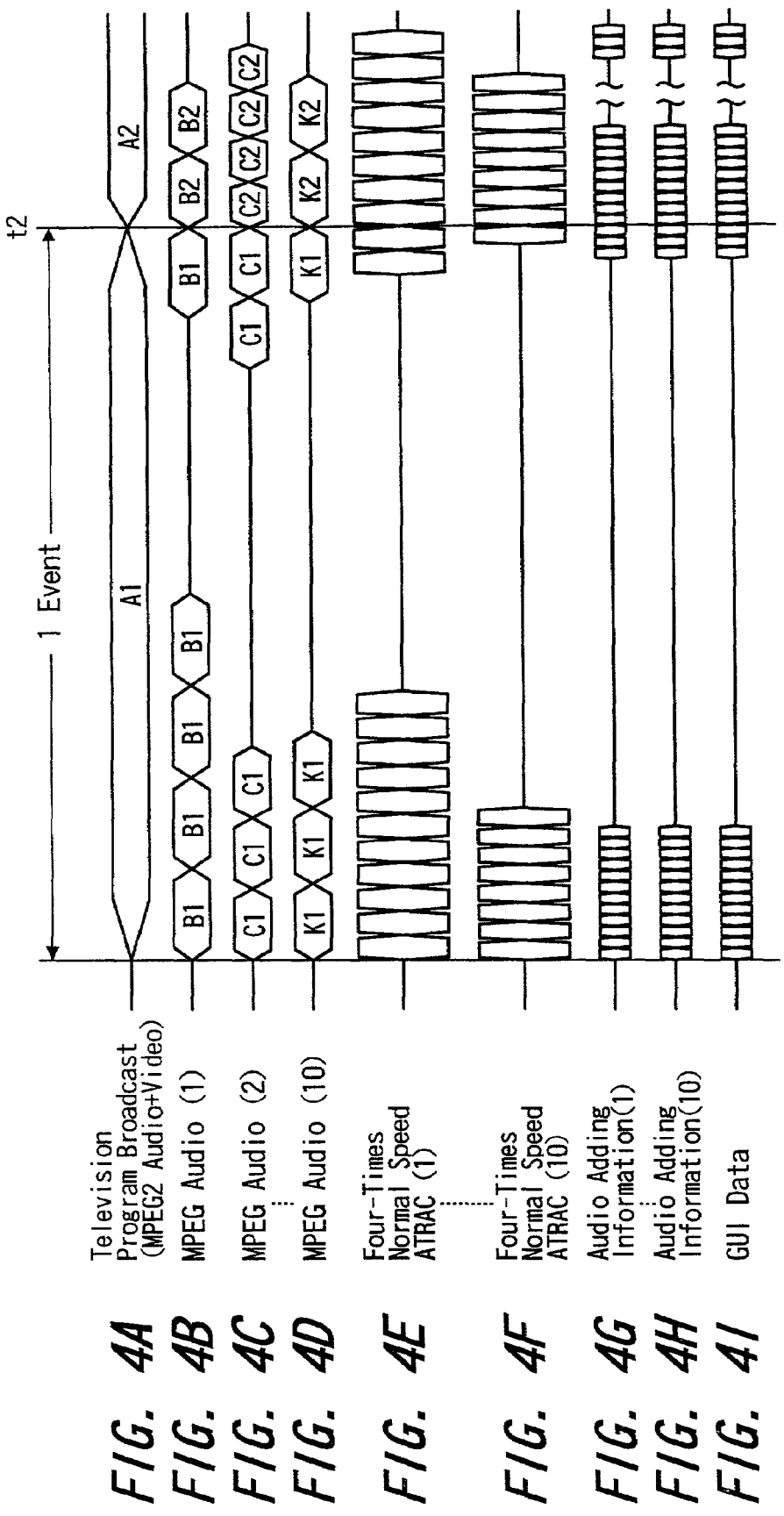
FIG. 4 is an explanatory diagram showing examples of transmitted data according to an embodiment of the present invention.
Figure 5:
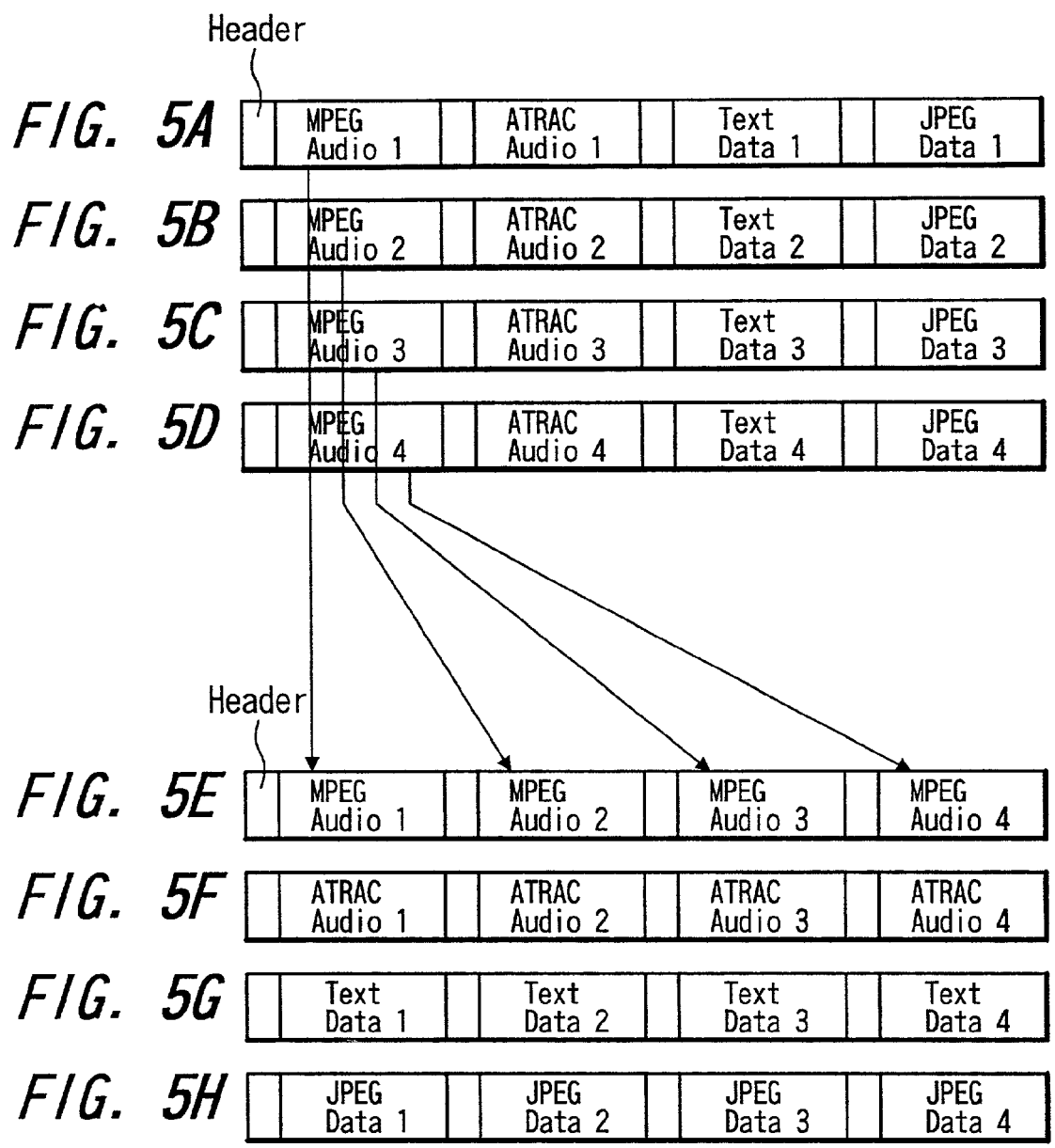
FIG. 5 is an explanatory diagram showing examples of transmitted states according to an embodiment of the present invention.

As shown in FIG. 4, in the event from the time t1 to the time t2, a music program having predetermined contents A1 is broadcast by the ordinary moving picture program broadcasting. In the event starting from the time t2, a music program having predetermined contents A2 is broadcast. Contents that are broadcast in this ordinary music program are moving pictures and sounds.

The audio channel prepares 10 channels from channel CH1 to CH10 as shown in FIGS. 4B to 4D and in FIGS. 4E to 4F, for example. Each of the audio channels CH1, CH2, CH3, . . . , CH10 broadcasts the same music repeatedly during one event. Specifically, during the event from the time t1 to the time t2, the audio channel CH1 repeatedly transmits a tune B1, the audio channel CH2 repeatedly transmits a tune C1, and similarly, the audio channel CH10 repeatedly transmits a tune K1. In the event starting from the time t2, the audio channel CH1 repeatedly transmits a tune B2, the audio channel CH2 repeatedly transmits a tune C2, and similarly, the audio channel CH10 repeatedly transmits a tune K2. This relationship applies for the MPEG audio channel and the four-times normal speed ATRAC audio channel as well.

Specifically, in FIGS. 4B to 4D and FIGS. 4E to 4F, the same numerals within the parentheses of the MPEG audio channels and the four-times normal speed ATRAC audio channels indicate the channel programs of the same tune. Numerals within the parentheses of the channel programs of the audio adding information shown in FIGS. 4G to 4H indicate audio adding information added to audio data having the same channel program. Further, still picture data and text data transmitted as GUI data also are formed at every channel. These data are time-division-multiplexed within the MPEG2 transport packets and transmitted as shown in FIGS. 5A to 5D, and are rearranged within the IRD 12 by using header information of each data packet as shown in FIGS. 5E to 5H.

The receiving equipment 3 at each home will be described next.

Figure 6:
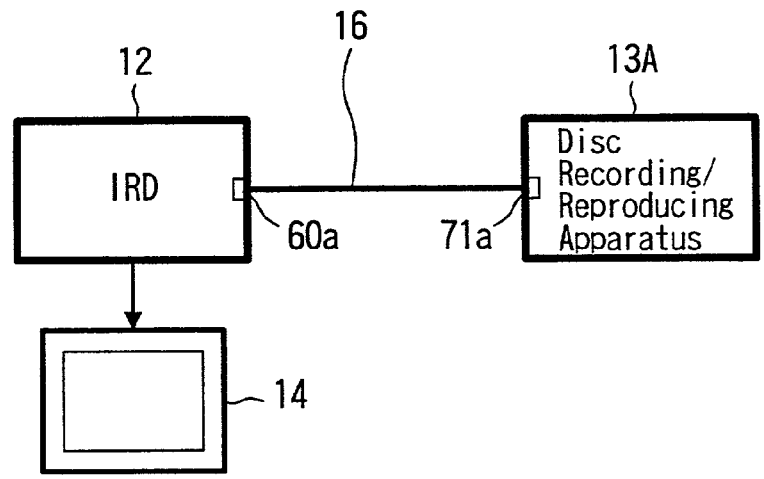
FIG. 6 is a block diagram showing an example of connection according to an embodiment of the present invention.

As shown in FIG. 1, as the receiving equipment at each home, there are prepared the parabolic antenna 11, the IRD 12, the storage device 13 and the television receiver 14. As the storage device, there is used a recording and reproducing equipment 13A using a magnetooptical disk called an MD (mini disc) as a recording medium as shown in FIG. 6. The recording and reproducing equipment 13A according to this embodiment is a deck including a terminal 71a which can be connected with an IEEE 1394 system bus line 16. The IRD 12 also includes a terminal 60a which can be connected with the IEEE 1394 system bus line 16. The manner in which the IRD 12 and the recording and reproducing equipment 13A are connected with each other via the IEEE 1394 system bus line 16 will be described. The IEEE 1394-dependent recording and reproducing equipment 13A is able to store text data including jacket data and words data as well as audio data of music selected by the IRD 12. According to the connection using the IEEE 1394 system bus line 16, a plurality of devices (e.g., up to 64 devices) can be connected by a so-called link connection, and a plurality of storage devices can be connected to the IRD 12 by the IEEE 1394 system bus line 16 at the same time. Accordingly, other devices may often be connected between the IRD 12 and the recording and reproducing equipment 13A.

Figure 8:
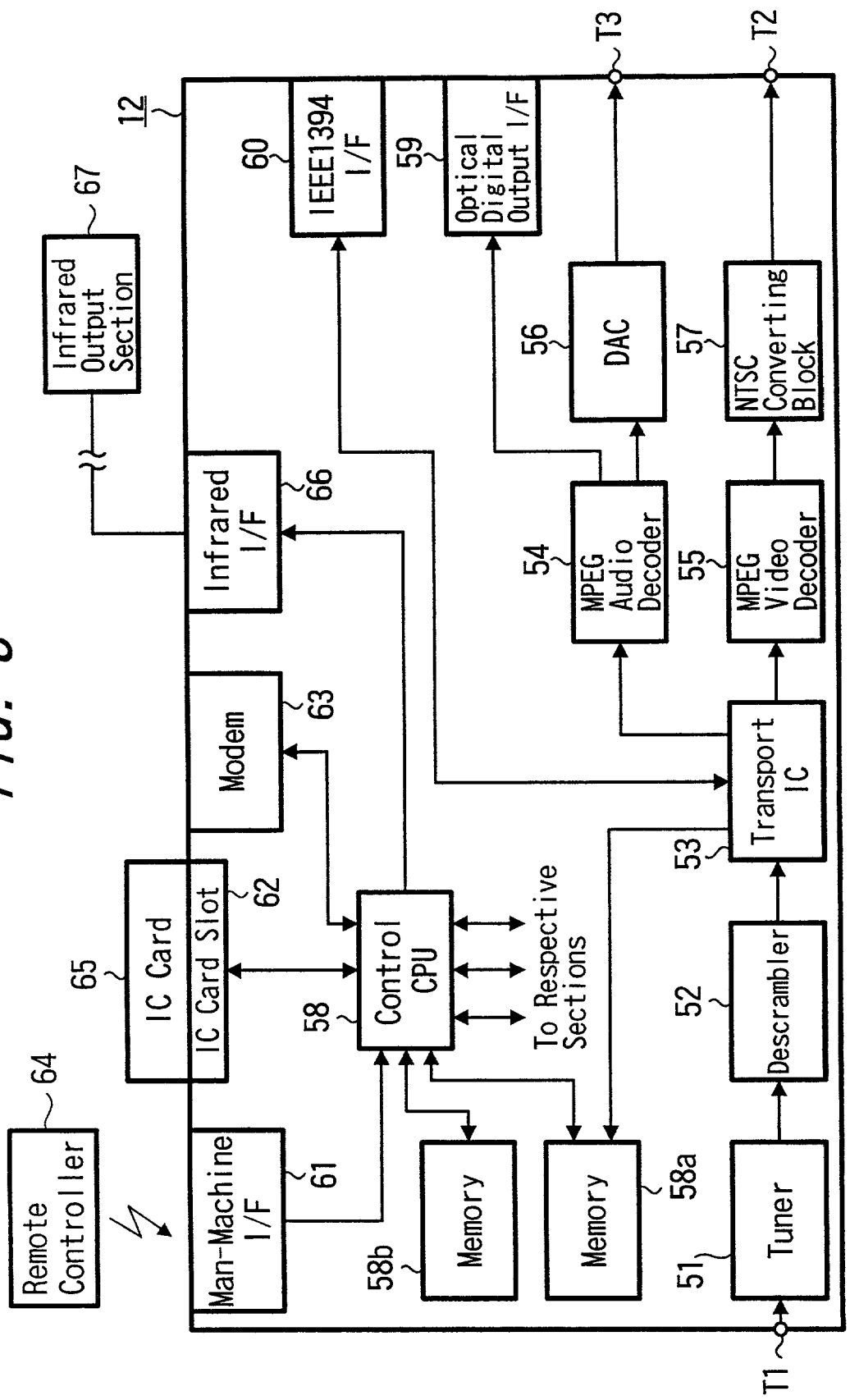
FIG. 8 is a block diagram showing an example of an arrangement of an IRD according to an embodiment of the present invention.

FIG. 8 shows an example of the arrangement of the IRD 12. As external terminals or interfaces, the IRD 12 includes an input terminal T1, an analog video output terminal T2, an analog audio output terminal T3, an optical digital output interface 59, an IEEE 1394 interface 60, a man-machine interface 61, an IC card slot 62, a modem 63 and an infrared interface 66.

The input terminal T1 is the terminal to which the received signal that was converted into a predetermined frequency by the LBN 15 attached to the parabolic antenna is inputted. The analog video output terminal T2 is the terminal from which the analog television signal is supplied to the television receiver 14. The analog audio output terminal T3 is the terminal from which the analog audio signal is supplied to the television receiver 14. The analog audio output terminal T4 is the terminal from which the analog audio signal is supplied to an analog input storage device. The optical digital output interface 59 is based on the IEC 958 to transmit PCM audio data to an optical fiber cable (not shown). The IEEE 1394 interface 60 transmits video data, audio data, various commands, etc. to the IEEE 1394 format bus line. The man-machine interface 61 transmits inputted data, which is obtained in the form of an infrared signal when a user operates a remote control device 64, to a control CPU 58. An IC card is inserted into the IC card slot 62. The modem 63 is connected through the telephone line network 4 to the accounting server 5. The infrared interface 66 is the interface used to control the storage device by the infrared signal from the control CPU 58. An infrared signal for controlling a storage device is outputted from an infrared output section 67 connected through a predetermined signal line to the infrared interface 66.

A tuner 51 selects a signal having a predetermined frequency from received signals supplied from the terminal T1 based on a setting signal from the control CPU 58, demodulates and error-corrects the selected signal and outputs an MPEG transport stream. A descrambler 52 receives the MPEG transport stream from the tuner 51, receives descrambling key data from the IC card 65 through the IC card slot 62 and the control CPU 58 and descrambles the transport stream by using the key data. A transport IC 53 receives a command inputted when the user operates the remote controller 64 through the man-machine interface 61 and the control CPU 58 and extracts MPEG video data and MPEG audio data of a desired television program from the transport stream. An MPEG video decoder 55 decodes the MPEG video data supplied from the transport IC 53 to provide video data obtained before data is compressed. An MPEG audio decoder 54 decodes the MPEG audio data supplied from the transport IC 53 to provide audio data (PCM audio data) obtained before data is compressed. A DA converter 56 converts the audio data supplied from the MPEG audio decoder 54 into an analog audio signal and supplies the analog audio signal to the analog audio output terminal T3.

The control CPU 58 processes the whole of the IRD 12. Work memories 58a, 58b are connected to the control CPU 58. The memory 58a is the memory in which data can freely be rewritten. MHEG data and audio adding information used to generate GUI pictures from the transport stream received at the tuner 51 and extracted by the transport IC 53 are stored in this memory 58a. The memory 58b is a nonvolatile memory in which programs are set when the IRD 12 is manufactured. In this memory, there are stored in advance various programs necessary for operating the IRD 12. A program stored in the memory 58b is a resident program which is activated based on the MHEG data, for example, to control processing for generating the GUI picture and processing for controlling the storage device connected to the IRD 12.

The control CPU 58 receives commands inputted when the user operates the remote control equipment 64 through the man-machine interface 61. The modem 63 is connected to the control CPU 58. Information necessary for accounting is stored in the IC card 65. Information in the IC card 65 is transmitted through the telephone line network 4 to the accounting server 5 (FIG. 1) by using the modem 63.

The control CPU 58 produces pictures of list pages, pictures of information pages of respective tunes or GUI picture data based on the data stored in the memory 58a. Picture data thus produced are written in predetermined areas of a buffer memory within the MPEG video decoder 55. Consequently, as shown in FIG. 2, the picture of the list page of the broadcast tune, the picture of the information page of the respective tunes or the GUI picture can be displayed on the designated areas on the screen.

Next, operation of the IRD 12 shown in FIG. 8 will be described.

In the IRD 12 shown in FIG. 8, when the user selects the channel of the music contents distribution system that had been described so far, the GUI picture shown in FIG. 2 is displayed on the screen of the television receiver 14.

At that very moment, the received signals inputted to the terminal T1 are supplied to the tuner 51. The tuner 51 selects a signal having a predetermined receiving frequency from the received signals based on the setting signal from the control CPU 58, demodulates and error-corrects the selected signal and outputs the MPEG transport stream.

An output from the tuner 51 is supplied to the descrambler 52. The descrambling key data stored in the IC card 65 is inputted to the descrambler 52 through the IC card slot 62 and the control CPU 58, and this descrambler descrambles the MPEG transport stream by using the key data. The MPEG transport stream thus descrambled is supplied to the transport IC 53.

A command inputted from the remote control equipment 64 by the user is inputted to the transport IC 53 through the man-machine interface 61 and the control CPU 58. This transport IC extracts MPEG video data and MPEG audio data of a desired television program from the transport stream in accordance with the command and supplies the video data and the audio data to the MPEG video decoder 55 and the MPEG audio decoder 54.

The MPEG video data supplied to the MPEG video decoder 55 is decoded into video data obtained before data is compressed, and supplied to an NTSC converting block 57, in which it is converted into a composite video signal and outputted from the analog video output terminal T2 to the television receiver. The MPEG audio data supplied to the MPEG audio decoder 54 is decoded into audio data obtained before data is compressed, and supplied to a DA converter 56, in which it is converted into an analog audio signal and outputted from the analog audio output terminal T3 to the television receiver.

When the viewer selects music based on the tune list 21B displayed on the GUI picture shown in FIG. 2 and listens to audio data of the selected music on trial, MPEG audio data is extracted by the transport IC 53, the extracted audio data is decoded by the MPEG audio decoder 53, digital-toanalog-converted by the DA converter 56 and outputted from the analog audio output terminal T3 to the television receiver 14 (FIG. 1).

When the viewer downloads audio data by pressing the download button 28 on the GUI picture shown in FIG. 2, audio data is extracted by the transport IC 53 and audio data is outputted from any one of the analog audio output terminal T3, the optical digital output interface 59 and the IEEE 1394 interface 60.

Specifically, as shown in FIG. 6, when the IEEE 1394 dependent recording and reproducing equipment 13A is connected to the IEEE 1394 interface 60, the four-times normal speed ATRAC data is extracted by the transport IC 53 and supplied through the IEEE 1394 interface 60 to the IEEE 1394 dependent recording and reproducing equipment 13A. At that very time, the jacket data compressed by the JPEG system is extracted by the transport IC 53 and supplied through the IEEE 1394 interface 60 to the IEEE 1394 dependent recording and reproducing equipment 13A. Further, at that very time, text data such as the words and the profile of the artist is extracted by the transport IC 53 and supplied through the IEEE 1394 interface 60 to the IEEE 1394 dependent recording and reproducing equipment 13A.

When a storage device (of the type which does not include the IEEE 1394 interface) is connected to the optical digital output interface 59, the MPEG audio data is extracted by the transport IC 53, decoded by the MPEG decoder 54, and PCM audio data is supplied through the optical digital output interface 59 to the storage device. The arrangement therefor will be described later on.

Figure 7:
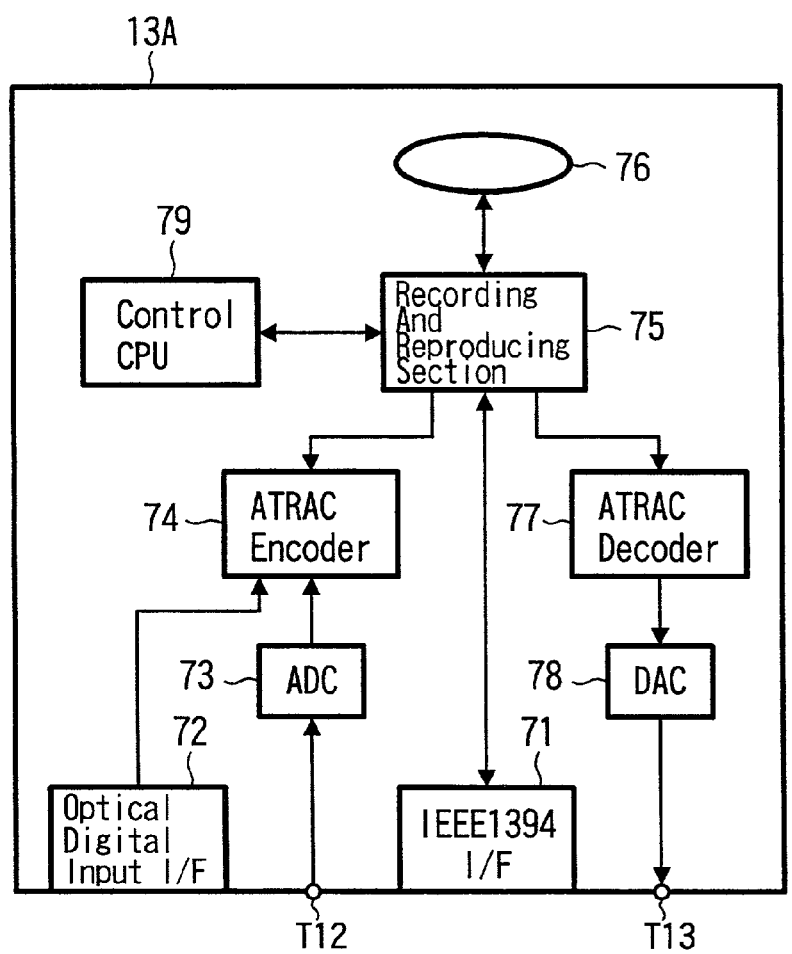
FIG. 7 is a block diagram showing an example of an arrangement of a recording and reproducing equipment according to an embodiment of the present invention.

FIG. 7 is a block diagram showing an example of the arrangement of the IEEE 1394 dependent recording and reproducing equipment 13A. The IEEE 1394 dependent recording and reproducing equipment 13A includes an IEEE 1394 interface 71, an optical digital input interface 72, an analog audio input terminal T12 and an analog audio output terminal T13. The IEEE 1394 interface 71 is directly connected to a recording and reproducing section 75. The optical digital input interface 72 is connected through an ATRAC encoder 74 to the recording and reproducing section 75. The analog audio input terminal T12 is connected through an A/D converter 73 to an ATRAC encoder 73. The analog audio output terminal T13 is connected through a D/A converter 78 and an ATRAC decoder 77 to the recording and reproducing section 75. A disk (magnetooptical disk) 76 is set to the recording and reproducing section 75, and data is recorded on and reproduced from this disk 76. Although not shown, this recording and reproducing equipment includes a control CPU for controlling the whole of the IEEE 1394 dependent recording and reproducing equipment 13A and a man-machine interface.

Next, the manner in which the IEEE 1394 dependent recording and reproducing equipment 13A operates upon recording will be described.

When the IEEE 1394 interface 71 and the IEEE 1394 interface 60 of the IRD 12 shown in FIG. 8 are connected with each other, the audio data of the music transmitted from the IEEE 1394 interface 60, the text data such as the words and the still picture data such as the jacket are inputted from the IEEE 1394 interface 71 to the recording and reproducing equipment and recorded on the disk 76 by the recording and reproducing section 75. Respective data are recorded on the disk 76 according to the extended MD format as will be described later on.

When PCM audio data is inputted to the optical digital input interface 72 from the outside, the inputted PCM audio data is encoded by the ATRAC encoder 74 and recorded on the disk 76 by the recording and reproducing section 75.

An analog audio signal is inputted to the analog audio input terminal T12 from the outside, the inputted analog audio signal is analog-to-digital-converted by the AD converter 73, encoded by the ATRAC encoder 74 and recorded on the disk 76 by the recording and reproducing section 75.

Specifically, the IEEE 1394 dependent recording and reproducing equipment 13A records the words data and the still picture data of the jacket together with the audio data of the music only when it and the IRD 12 are connected to each other by the IEEE 1394 interface, and records only the audio data when they are connected to each other by the optical digital interface or the analog audio connection.

Upon reproduction, a reproduced signal can be outputted from the IEEE interface 71 or the analog audio output terminal T13. When a reproduced signal is outputted from the IEEE 1394 interface 71, if the words data and the jacket data are recorded on the disk 76 together with the audio data of the music, then the music data can be outputted to an IEEE 1394 dependent audio device (amplifier, etc.), the words data and the jacket data can be displayed on an IEEE 1394 dependent display and can be printed out by an IEEE 1394 dependent printer.

In this manner, the IEEE 1394 dependent recording and reproducing equipment to which the present invention is applied is able to record and reproduce the words data and the jacket data as well as the audio data of the music.

Figure 9:
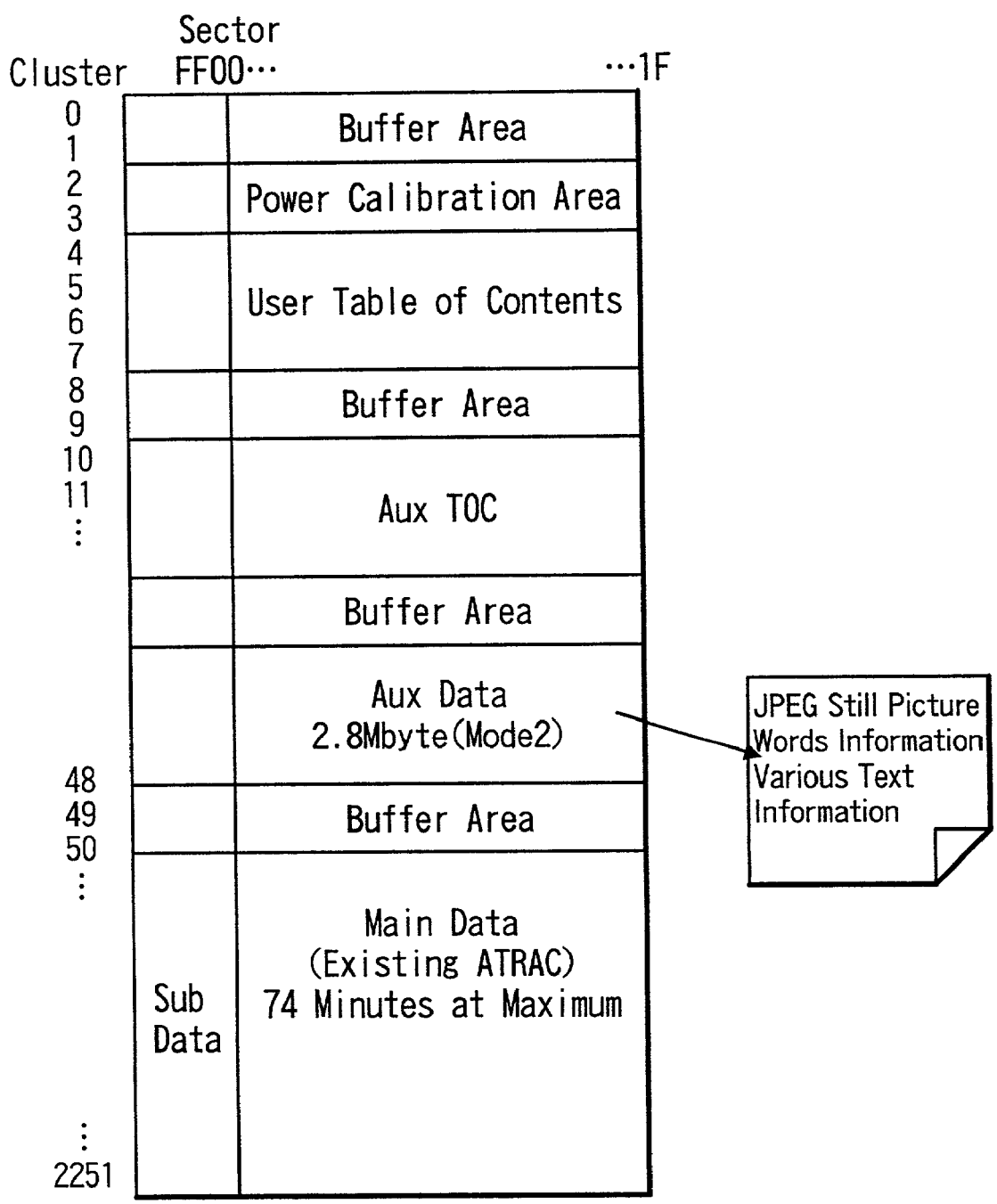
FIG. 9 is an explanatory diagram showing the manner in which data is recorded on a disk according to an embodiment of the present invention.

The above recording and reproduction become possible by using an extended MD format shown in FIG. 9. As illustrated, audio data of tune is recorded on a main data area by the ATRAC system, which is the same as the existing MD format. According to the extended MD format, the aforementioned jacket data, words data, or the like are recorded on an auxiliary data (Aux Data) area of 2.8 Mbytes. The jacket data and the words data as well as the audio data of the music can be recorded and reproduced by using this format. This extended format can maintain a compatibility with the existing MD format.

Processing executed when the receiving equipment shown in FIG. 7 downloads the ATRAC audio data of the music which is the music program and the jacket data and the words data which are the audio adding information will be described with reference to a flowchart of FIG. 10.

First, a user the operates the IRD 12 to select an EMD (Electric Music Download) channel, i.e., the music broadcasting channel in which music data can be downloaded as was described so far (step 101). To be concrete, while the user is watching an EPG picture displayed on the television receiver 14, the user gives a channel selecting command to the remote control equipment 64 shown in FIG. 7. In the IRD 12, the control CPU 58 receives the user channel selecting command through the man-machine interface 61 and supplies a channel setting signal to the tuner 51 thereby to set a desired channel.

When this channel is selected, it is determined by the control CPU 58 based on section data called a PMT (Program Map Table) whether or not the MHEG data for forming the EPG picture (list picture) exists in the selected channel (step 102). If the MHEG data for forming the EPG picture does not exist in the selected channel, then it is determined that the selected channel is not the channel in which the music data can be downloaded. Then, control is ended. When the channel in which the above ATRAC audio data is transmitted is selected, the MHEG data for forming the EPG picture exists in the selected channel, and hence the control CPU 58 activates a program (resident program), which interprets the previously-prepared MHEG data, in the work memory 58*b* to interpret the received MHEG data (step 103).

Based on the interpreted MHEG data, the control CPU 58 forms image data of EPG picture and supplies the image data to the decoder 55 so that the image data is displayed on the screen of the television receiver 14 connected to the IRD 12 (step 104). The displayed EPG picture is the picture shown in FIG. 2, for example. The control CPU 58 is placed in the standby mode until the user downloads the selected music by operating the keys of the remote control equipment 64 (step 105). When a remote control signal corresponding to the depression of the download button 28 is supplied, a get device program within a resident program prepared beforehand in the memory 58*b* is activated. A device ID of the storage device 13A connected via the IEEE 1394 system bus line is obtained by this get device program and transmitted to an MHEG data execution processing section (step 106). The device ID is an identification code granted beforehand to the connection of the IEEE 394 system bus line by a predetermined bit rate (64 bits) and in which a vendor code, a type code of device type and a serial code of a device are arranged according to a predetermined standard. When the device ID is discriminated by the program prepared in the memory 58*b*, the control CPU 58 can understand the type and the function of the connected device. Details of processing for obtaining a device ID by the resident program will be described later on.

When the control CPU 58 obtains the device ID of the connected storage device, it generates image data used to display a list of devices connected to the IRD 12 based on the obtained device ID and supplies the generated image data to the decoder 55 to display the image data on the screen of the television receiver 14 connected to the IRD 12 (step 107). The control CPU 58 is placed in the standby mode until the user selects the device displayed on the screen by operating the keys of the remote control equipment 64 (step 108). When the remote control signal corresponding to the selecting operation of this device is supplied, the control equipment is placed in the standby mode until ATRAC data of the number that was instructed to be downloaded at the step 105 is received. At the right time in which this data is received, still picture data (JPEG data) such as jacket data of this number and text data such as words of this number are transmitted to the selected device (storage device) from the IEEE 1394 interface 60 to the bus line 16. At that very time, a node ID set to the selected device is granted to data transmitted from the IEEE 1394 interface 60 as a destination address. The ATRAC data which is audio data of the number is transferred in an isochronous transfer mode (isochronous transfer), and the JPEG data and the text data are transferred in an asynchronous transfer mode (asynchronous transfer). Control data which enables the device at the destination to execute processing such as recording transmitted ATRAC data also is transmitted in the asynchronous transfer mode. With this processing, the data transmitted to the bus line 16 is recorded on a connected device, i.e., the disk loaded onto the IEEE 1394 dependent recording and reproducing equipment 13A in the state shown in FIG. 9.

It is determined by the control CPU 58 whether or not the download of all data concerning the number selected by the IEEE 1394 bus line 16 is ended (step 110). If it is determined that the download is ended, then it is determined whether or not the download of another number is instructed (step 111). If it is determined that the download of another number is instructed, then control goes back to the step 109, whereat another number is downloaded. If it is determined at the step 111 that the download of all selected numbers is ended, processing concerning the download is ended. When the download of this ATRAC audio data is executed, if this data is pay data, then predetermined accounting processing is executed (details of accounting processing will be omitted).

Figure 11:
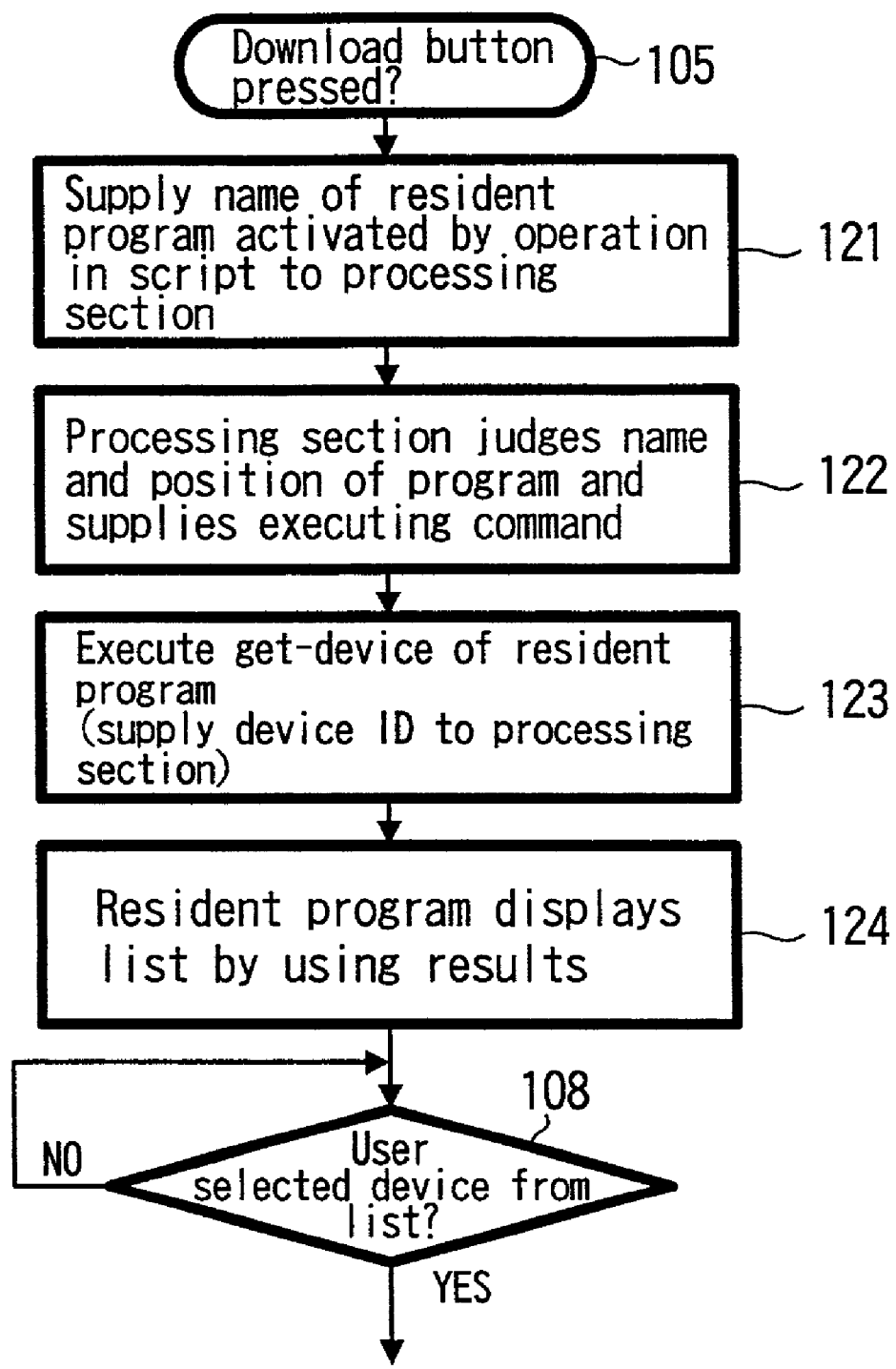
FIG. 11 is a flowchart to which reference will be made in explaining an example of processing executed when downloading is instructed according to an embodiment of the present invention.
Figure 12:
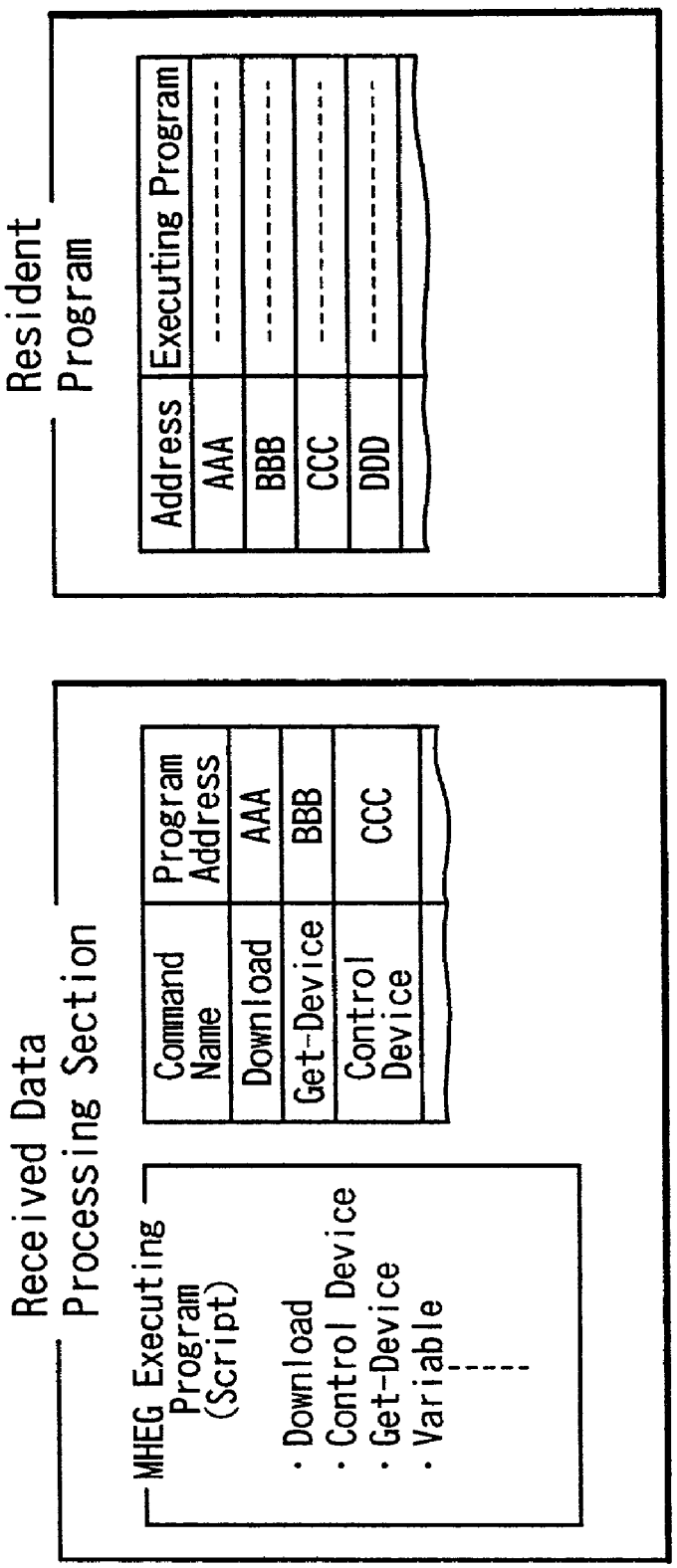
FIG. 12 is an explanatory diagram showing a relationship between received data and programs prepared in the IRD according to an embodiment of the present invention.

The manner of getting a device ID based on the resident program shown in this flowchart will be described more in detail with reference to a flowchart of FIG. 11 and a diagram showing a correspondence of programs shown in FIG. 12. First, the states of the programs will be described with reference to FIG. 12. As the program (script) shown by received MHEG data and which is stored in the memory 58*a* connected to the control CPU 58, there are prepared a program for instructing the download, a program for instructing control device processing to control a connected storage device, a program for instructing get-device processing to obtain a device ID of a connected storage device, a setting area of variables set by each processing, etc. Addresses of resident programs corresponding to commands of programs for instructing each processing are set to the control CPU 58. Execution programs of respective commands are prepared beforehand at predetermined address positions of the memory 58*b*.

The processing for getting the device ID by the resident program in the state in which the programs are set as described above will be described with reference to the flowchart of FIG. 11. When the command corresponding to the depression of the download button is issued at the step 105 of the flowchart of FIG. 10, a name of a resident program activated by operation in the script (get-device) is supplied to a processor section of the control CPU 58 (step 121). The processor section judges the storage address of the corresponding program (get-device) stored in the memory 58*b* based on the command instructed by the received program and the data corresponding to the address of the resident program prepared on the IRD 12 side and transmits an execution command of the program of such address (step 122).

Since this execution command is generated, the processor section within the control CPU 58 executes the get-device program stored in the memory 58*b* (step 123). While this get-device program is being executed, data for requesting the return of device ID is transmitted from the IEEE 1394 interface 60 to all nodes (devices) connected to this interface 60 by the bus lines in the asynchronous transfer mode, for example. All nodes which received this data return device IDS granted to the devices to the IRD 12 through the bus line in the asynchronous transfer mode, and returned data are supplied from the IEEE 1394 interface 60 to the control CPU 58. If this device ID is transmitted, the control CPU 58 judges the type of the device based on the transmitted device ID.

When there is connected as the storage device capable of recording ATRAC audio data (e.g., the IEEE dependent recording and reproducing equipment 13A connected as shown in FIG. 6), the control CPU 58 generates image data used to display a list of devices on the screen by using the resident program and supplies the image data to the decoder 55 so that the image data is displayed on the screen of the television receiver 14 connected to the IRD 12 (step 124). When the device list is displayed, types of devices judged from the device IDs (abbreviated names of device types such as MD, DVD and personal computer) are displayed. If there are a plurality of device types having the same name, then they are displayed with serial numbers like MD1, MD2, for example. Depending on the circumstances, more detailed information such as vender names may also be displayed.

Figure 10:
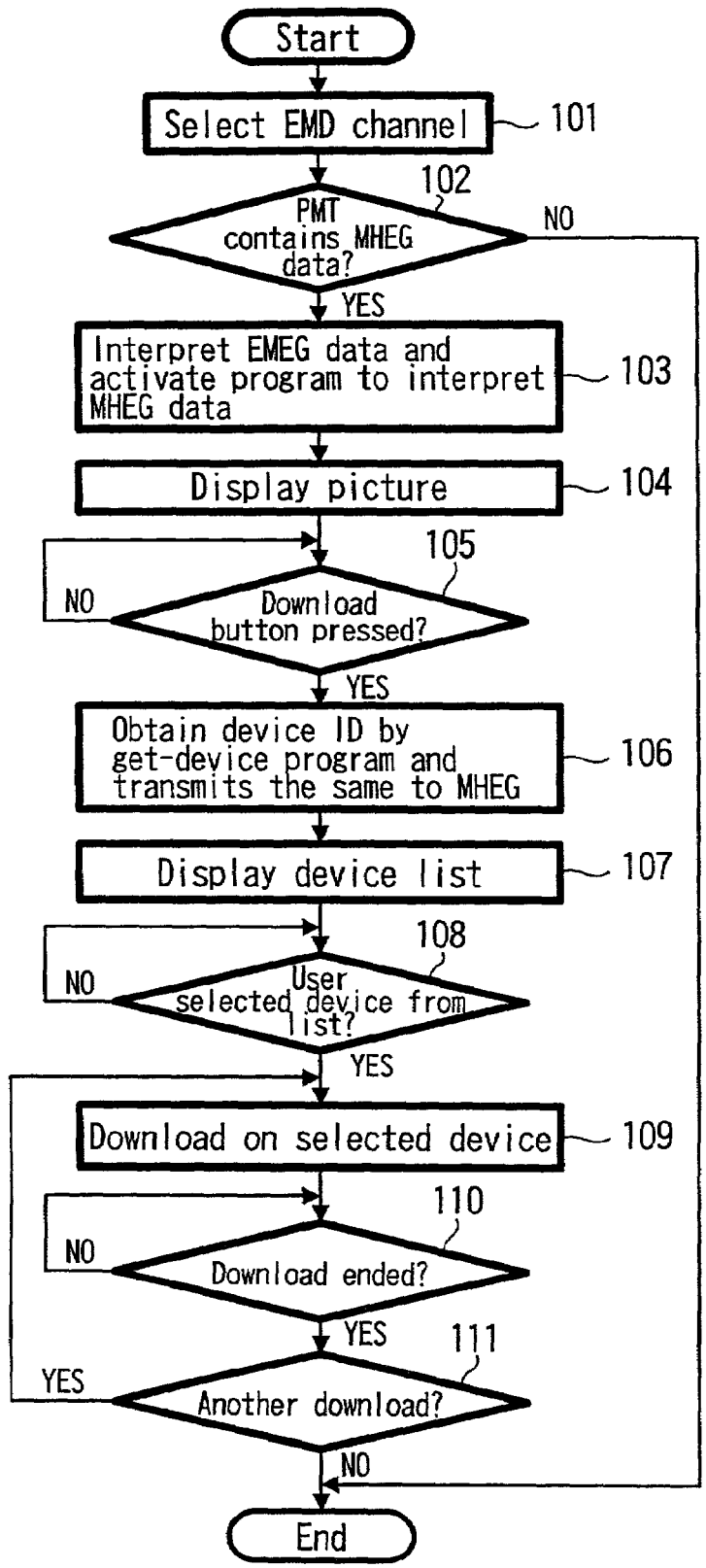
FIG. 10 is a flowchart to which reference will be made in explaining an example of downloading a predetermined channel according to an embodiment of the present invention.

The steps following the step 108 in which the user selects the device from the displayed device list are the same as those of the flowchart shown in FIG. 10.

With the above processing, when the device as the storage device capable of recording ATRAC audio data is connected to the IRD 12 through the IEEE 1394 system bus line, based on the MHEG data transmitted from the ATRAC audio data transmitting side, the processing for generating a list of connected devices is activated, the processing itself is executed by the resident program prepared beforehand within the IRD 12 to display the list and the user can easily select a device onto which ATRAC audio data is downloaded. Although the IRD 12 displays the list based on the MHEG data transmitted from the transmitting side apparently, in actual practice, the details of the processing for getting the device ID are executed by the resident program prepared in the IRD 12 and a proper device ID can be obtained based on the actual arrangement of the IRD 12. In sectionicular, since a large number of devices (e.g., 64 devices) can be connected by the IEEE 1394 format bus line, a proper device can efficiently be selected from a plurality of devices connected to the IRD 12 by the bus line based on the displayed list.

Figure 13:
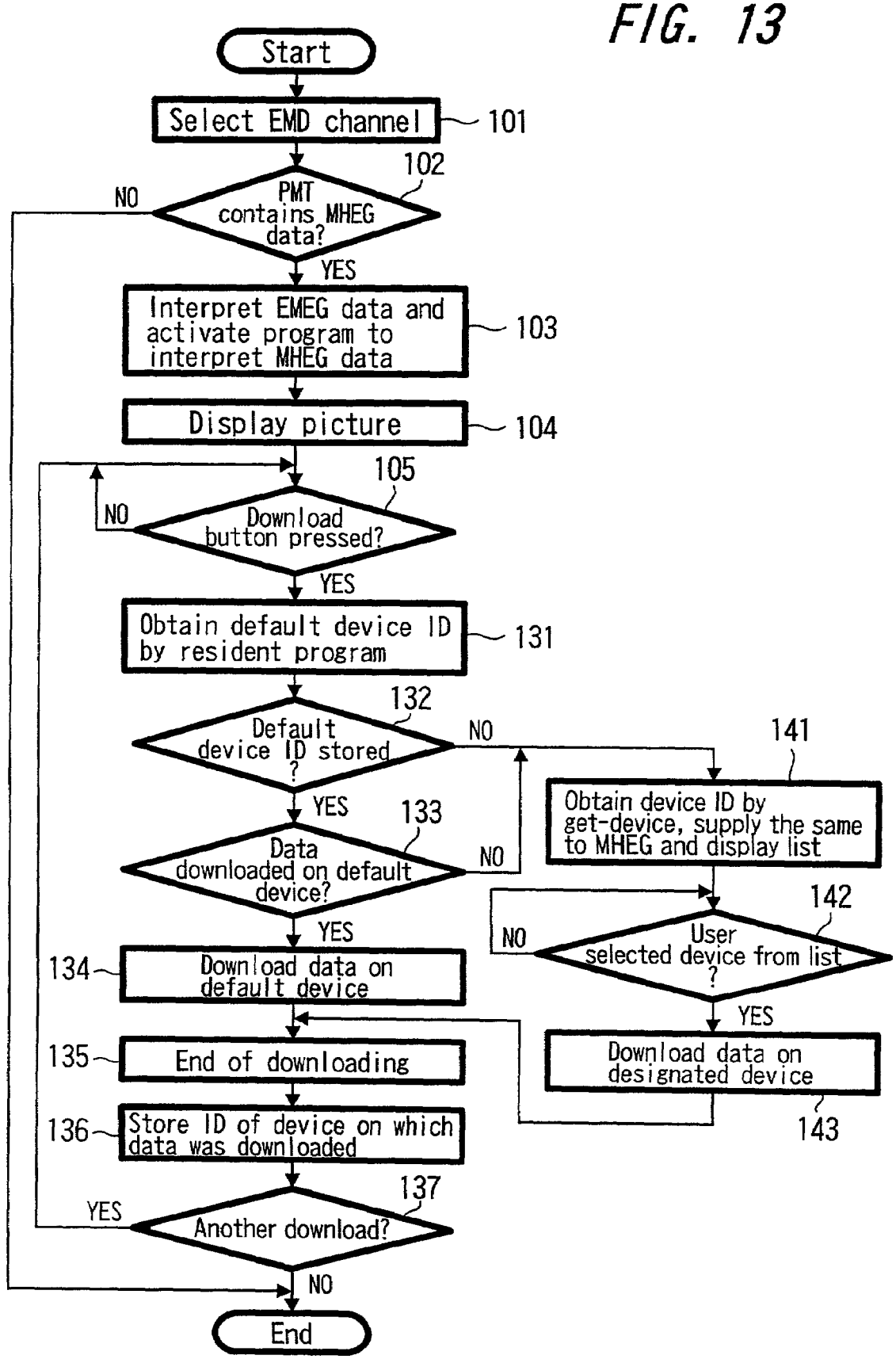
FIG. 13 is a flowchart to which reference will be made in explaining another example of a download.

While the download is being selected, device IDs are always obtained and the list of all devices is displayed in the processing shown in the flowchart of FIG. 10. If a default device get request program stored in the memory 58b judges the most desirable device from more than one device currently-connected by some processing and returns data of the most desirable device to the second program, then a user can omit operation for selecting a device and can more easily and efficiently download data. This processing for selecting a desirable device will be described later on. Processing executed when the default device exists will be described with reference to a flowchart of FIG. 13. In the flowchart of FIG. 13, the steps from the step 101 for selecting the EMD channel to the step 105 for downloading the selected number are the same as those of the flowchart of FIG. 10.

Referring to FIG. 13, if it is determined at the step 105 that the download button is depressed, then the control CPU 58 within the IRD 12 gets the default ID into the CPU 58 (step 131). It is then determined whether or not the default device ID is stored in the control CPU 58 by the execution of this processing (step 132). If the default device ID is stored in the control central processing unit, then the control CPU 58 generates image data for urging the user to confirm the download on the default device and displays the image data on the screen of the television receiver 14 so that the user may confirm the download on the default device (step 133). When the user selects the download on the default device by operating the remote control equipment 64, the download on the default device is executed similarly to the processing at the aforementioned step 110 of the flowchart of FIG. 10 (step 134). When this download is finished (step 135), the device ID of the device to which the data has already been downloaded is stored in a predetermined memory within the control CPU 58 and set to the default device (step 136). Then, it is determined whether or not another number is downloaded (step 137). If it is determined that another number is downloaded, then control goes back to the step 105. If it is determined that another number is not downloaded, then the download processing is ended.

If it is determined at the step 132 that the default device ID is not stored and if it is determined at the step 133 that the number is not downloaded to the default device, then control goes to a step 141, whereat the device ID is obtained by the get-device processing and a list based on the obtained device ID is displayed (step 141). Then, the user selects a device from the displayed list (step 142) and executes the download on the selected device (step 143). The steps 141 to 143 are the same as the steps 106 to 109 described in the flowchart shown in FIG. 10. After the download was started at the step 143, control goes to a step 135, whereat the central processing unit is placed in the standby mode until the download is ended. At that time, the device ID of the device to which the number was downloaded is stored in a predetermined memory within the control CPU 58 as a default device ID (step 136).

In this manner, since the device ID of the device that had been used in the last time download is stored in the IRD 12 as the default device ID, when data is downloaded on the same device as that was used the last time, the processing for getting the device ID of the device connected via the bus line need not be executed, and hence a time required by the selection processing can be reduced. Moreover, the selecting operation required by the user is only the confirmation work at the step 133 and hence the user can operate the control equipment considerably easily. While the default device ID is stored in the predetermined memory at the step 136, the present invention is not limited thereto, and the default device ID may be stored before the download is ended. For example, although the designated device is connected to the network, if a recordable recording media is not inserted into the device, then the download will not be ended normally. If the device ID is stored even in such case, then after the user has made necessary operation (after the user has inserted a correct recording media), the external program again obtains the default device ID and executes the download processing based on the default device ID thus obtained so that the number of the user's input operation can be decreased, thereby making it possible for the user to use the control equipment more easily and efficiently.

Processing in which the program stored in the memory 58b properly selects the default device and transmits information to the external program will be described in detail. Most preferably, the ID of the device on which data was downloaded should be stored in the predetermined memory within the control CPU 58. Then, when the external program instructs the default device get request, the device ID stored in the memory should be transmitted to the external program. If default device IDs and their types are stored in the predetermined memory within the control CPU 58 at every type of the device in preparation for requests of default devices with device type designated from the external program, then even when data is downloaded onto various types of devices, default devices are being prepared for devices of respective types, and hence the user can save a lot of time and labor. As the types of devices, there are enumerated an MD recorder/player, a DAT recorder/player, a DVD recorder/player, a digital video (DV) recorder/player, a personal computer, etc.

Figure 14:
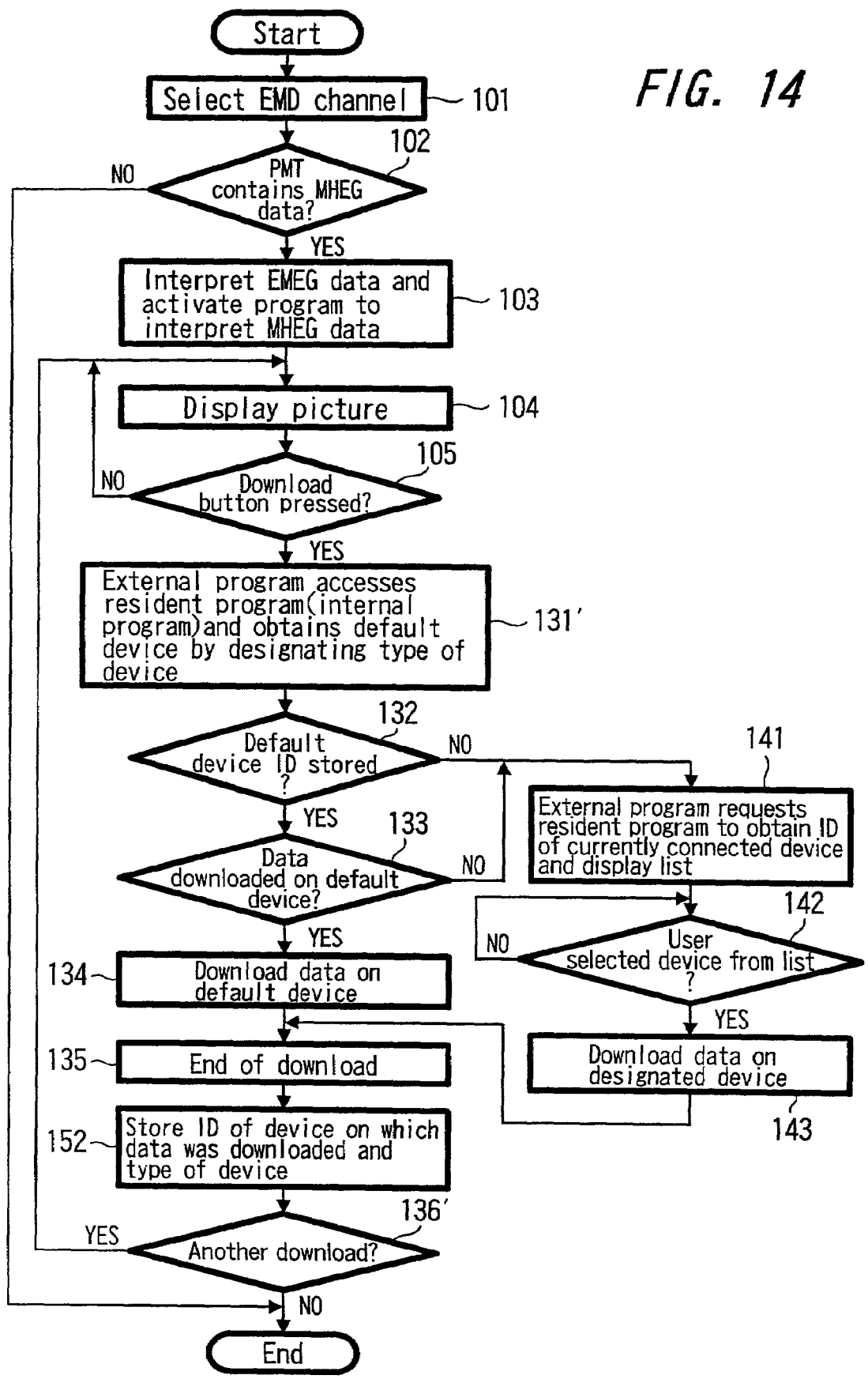
FIG. 14 is a flowchart to which reference will be made in explaining an example of processing executed when device IDS are stored depending on the kinds of devices according to an embodiment of the present invention.

An example of processing in that case will be described with reference to a flowchart of FIG. 14. The fundamental processing sequence is the same as the processing of the flowchart shown in FIG. 13. Specifically, after the depression of the download button has been detected at the step 105, when information of a default device is obtained at a step 131', a default device concerning the type designated at that time is obtained. Then, after the download has been ended at the step 135, when information of a default device is stored in the memory within the control CPU 58 at a step 136', not only the ID of such default device but also information of the device type (e.g., type such as MD, DAT) may be stored in the memory.

When the receiver (IRD) is powered for the first time or when the user disconnects the device which becomes the default device in the above sequence from the network in the next download, even though the devices that had been used so far are stored in the memory within the control CPU 58, the list should be displayed again and the user has to select the device. In such case, when the devices of the type designated by the external program are connected to the network, the optimum device may be selected from the connected devices as the default device and the internal program may return default device information to the external program.

Figure 15:
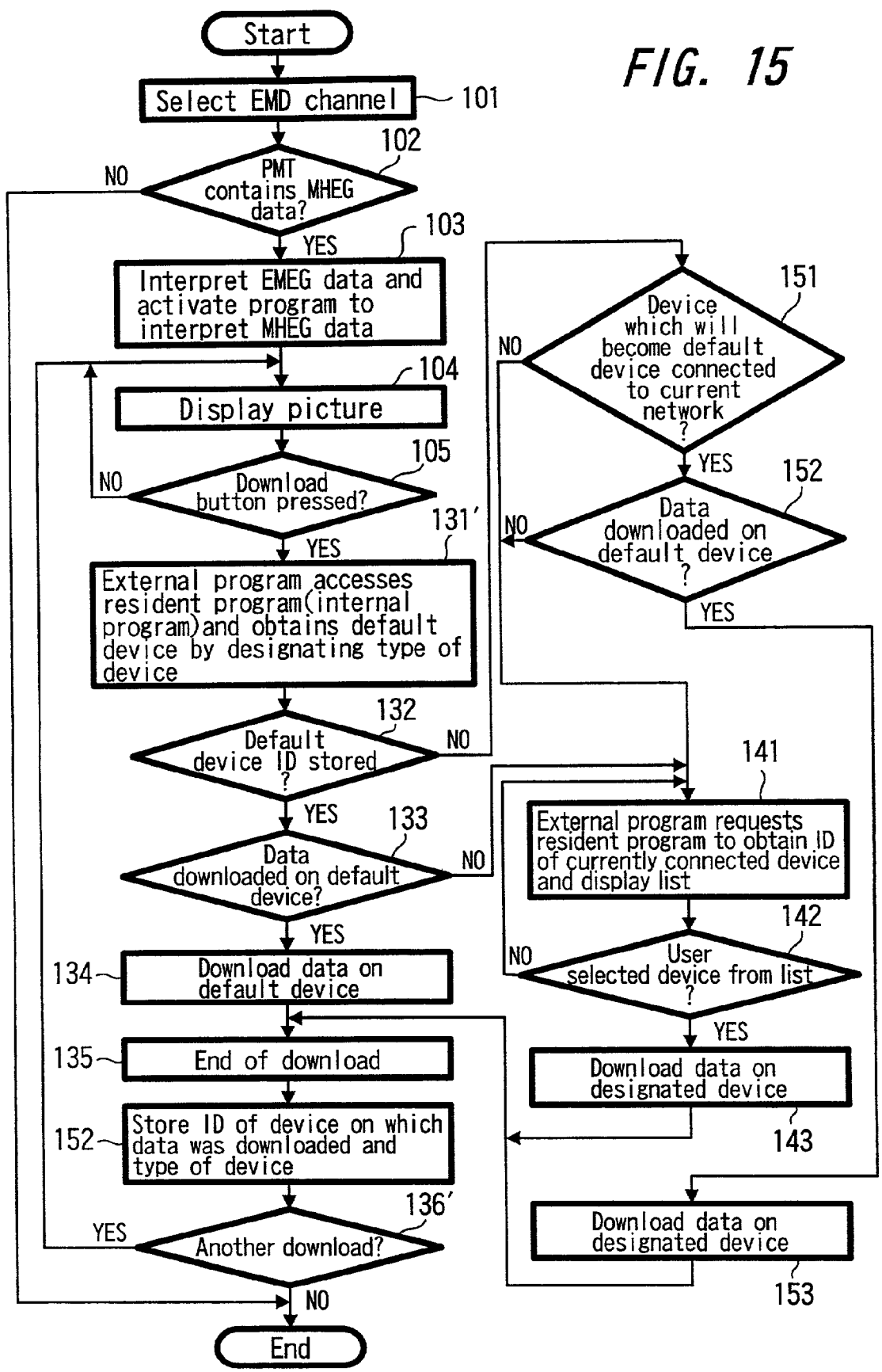
FIG. 15 is a flowchart to which reference will be made in explaining the manner in which an internal program selects a default device when a default device ID is not stored according to an embodiment of the present invention.

A flowchart of FIG. 15 shows an example of processing executed in the above case. Processing of this flowchart will be described below. Steps 101 to 132 are the same as those shown in FIG. 14. Steps executed when data is downloaded on the default device shown by an ID stored in the memory within the control CPU 58 (steps 133 to 137) also are the same as those shown in the preceding flowchart.

If it is determined at the step 132 that the default device ID is not stored in the memory within the control CPU 58, or if such device is disconnected from the network by the user even when the default device identification code is stored in the memory, then control goes to a step 151, whereat it is determined by the internal program whether or not a device which agrees with the conditions (types of devices on which data should be downloaded) requested from the outside at the step 131' is connected to the network at present. If it is determined that more than one proper devices are connected to the network, then the internal program selects the device that is connected nearest to the network from a timebase standpoint as the default device and returns information of such default device to the external program. If the default device is selected at the step 151, then it is determined by the user whether or not data should be downloaded on the selected device (step 152). If the user selects the download of data on the selected device, then the download of data on the selected device is executed (step 153), and control goes back to the step 135.

If the default device cannot be selected at the step 151 or if the user does not designate the download of data on the default device at the step 133 or 152, then control goes to a step 141, whereat the external program requests the resident program to obtain the device ID of the connected device and displays the list of the devices. Then, if the user selects a desired device from the list (step 142), then the download of data on the selected device is executed (step 143), and control goes back to the step 135.

Also in this case, when information of the default device is stored in the memory within the control CPU 58 at the step 136' after the download has been ended at the step 135, the ID of such device and the type of such device are stored in the memory.

Figure 16:
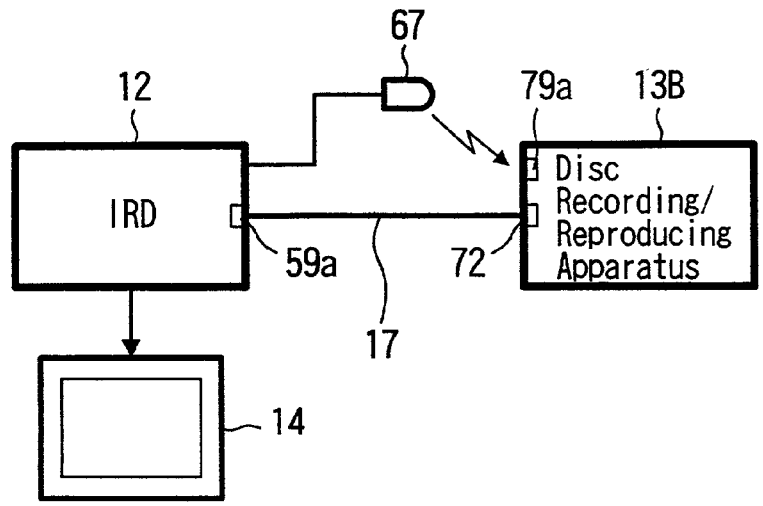
FIG. 16 is a block diagram showing an example of connection according to another embodiment of the present invention.

While data is downloaded on the storage device connected to the IRD 12 by the IEEE 1394 format bus line as described above, the present invention is not limited thereto and data can be downloaded on a storage device which does not include the IEEE 1394 format interface. FIG. 16 is a diagram showing an example of a system configuration of receiving equipment used in that case. A storage device prepared herein is a disc recording and reproducing equipment 13B using a magnetooptical disk called an MD as a recording medium. This disc recording and reproducing equipment includes an optical digital input interface 72. An output terminal 59a of an optical digital input interface 59 of an IRD 12 is connected to an input terminal of the optical digital input interface 72 of the disc recording and reproducing equipment 13B by an optical cable 17 (or coaxial cable) so that digital data can be transmitted. The disc recording and reproducing equipment includes also a man-machine interface 79a to which a remote control signal based on infrared rays is inputted. An infrared-ray output section 67 connected to the infrared-ray interface 66 (see FIG. 7) of the IRD 12 is disposed in the vicinity of an infrared-ray light-receiving section of this man-machine interface 79a.

Figure 17:
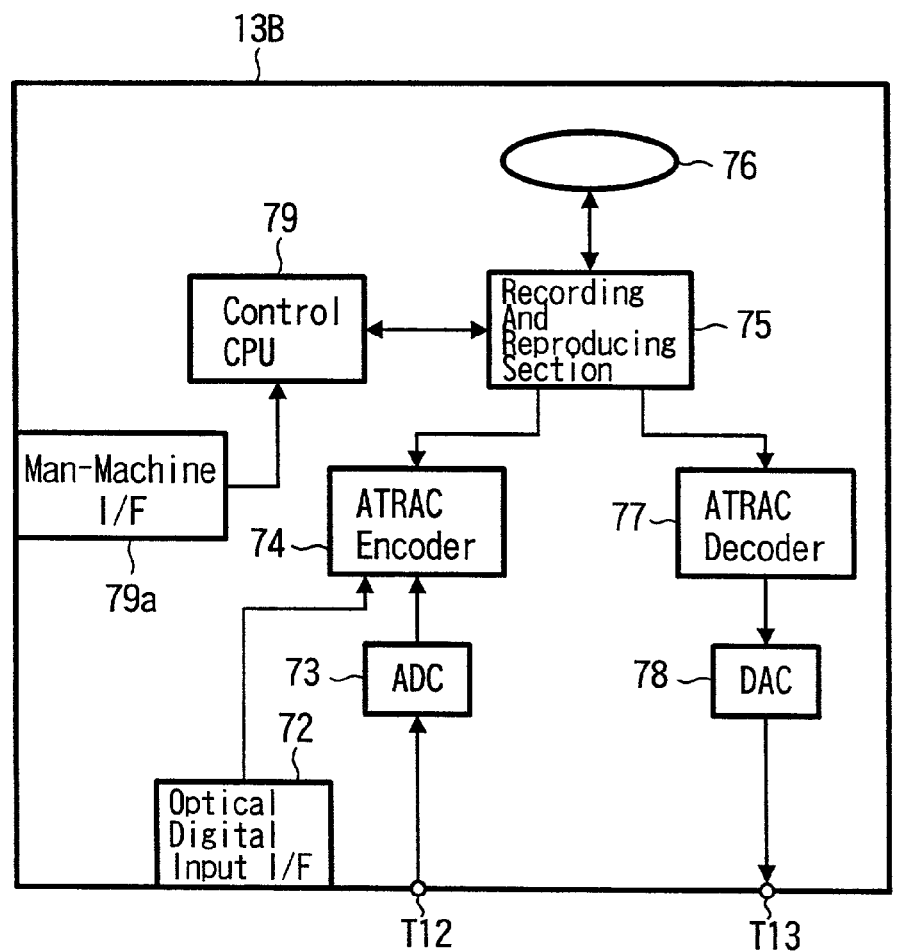
FIG. 17 is a block diagram showing an example of a recording equipment according to another embodiment of the present invention.

FIG. 17 shows an arrangement of the disc recording and reproducing equipment 13B. Although the fundamental arrangement by which data can be recorded on the disc and reproduced from the disc is the same as that of the disc recording and reproducing equipment 13A shown in FIG. 8, this disc recording and reproducing equipment is not provided with the IEEE 1394 interface but the man-machine interface 79a to which the remote control signal is inputted is connected to a control CPU 79. A rest of the arrangement is the same as that of the disc recording and reproducing equipment 13A shown in FIG. 8.

With the above arrangement, based on image data formed by the control CPU 58 of the IRD 12, some setting picture (e.g., initialization picture) is displayed on the screen of the television receiver 14, and the user sets the connection of the disc recording and reproducing equipment 13A by selecting pictures on the screen with the remote control equipment 64. At that time, the user may set the type of the connected device or the like. Based on the information set by the user's operation, the control CPU 58 gives a peculiar device ID to the connected device. For example, assuming that the device ID obtained from the device connected by the above IEEE 1393 format bus line is formed of 64 bits, then the device ID set by the user is formed of 65 bits in which 1 bit is added to the lowest-order bit of 64 bits and the user can recognize by the added 1 bit that the device code is the device code given by the setting of user 64 bits other than the lowest-order 1 bit may be set based on the state provided by the setting of user. Alternatively, bits other than the lowest-order 1 bit may be made negligible.

When the user operates the control equipment to instruct the download, received ATRAC audio data is supplied to the audio decoder 54 within the IRD 12, in which the ATRAC data is decoded into digital audio data which is not compressed, and supplied from the optical digital output interface 59 through the optical cable 17 to the optical digital input interface 72 of the disc recording and reproducing equipment 13B. At the same time, a command for controlling the recording at the recording and reproducing equipment 13B is generated by the control CPU 58 of the IRD 12 and such command is supplied to the infrared-ray interface 66 so that a remote control signal for starting the recording operation of the recording and reproducing equipment 13B is outputted from the infrared-ray output section 67 connected to the infrared-ray interface 66 to thereby record the supplied digital audio data on the disc. At that time, after the supplied audio data has been again encoded into the ATRAC audio data and compressed, the recording and reproducing equipment 13B records the encoded ATRAC audio data.

At the right time the download is ended, a command for stopping the recording at the recording and reproducing equipment 13B is generated from the control CPU 58 of the IRD 12, and such command is supplied to the infrared-ray interface 66 so that a remote control signal for stopping the recording operation at the recording and reproducing equipment 13B is outputted from the infrared-ray output section 67 connected to the infrared-ray interface 66 thereby to stop the recording operation on the disc.

When data is downloaded on the storage device by the connection which does not use the bus line as described above, still picture data and text data accompanying with the ATRAC audio data are not transmitted and only the audio data is recorded on the disc.

With the above arrangement, the present invention can cope with the download on the storage device which is not provided with the interface of the IEEE 1394 format bus line.

While the audio data called ATRAC audio data is downloaded on the storage device using the recording medium called the MD (mini disc) as described above, the present invention is not limited thereto, and can be applied to processing executed when other data such as audio data, image data, electronic mail data and various contents data of internet obtained from the outside are downloaded on the connected storage device based on program data simultaneously transmitted from the data transmitting side.

While the MHEG format data is transmitted as the EPG data distributed from the broadcast station side as described above, the present invention is not limited thereto, and can be applied to the case in which the above data is transmitted as data of other formats. For example, the present invention can be applied to the case in which data of HTML format and data of XML format are transmitted. For example, when the data of the XML format is transmitted, XML data may be interpreted at the step in which the MHEG data is interpreted in the flowchart of FIG. 10. This relationship applies for other processing in the embodiment than the flowchart of FIG. 10 as well.

While the digital satellite broadcasting relayed by the artificial satellite is applied as the transmission line from the transmitting side of audio data or the like to the receiving equipment as described above, the present invention is not limited thereto, and other broadcasting transmission line can be applied. For example, in a so-called cable television, the ATRAC audio data and the like may be transmitted by a predetermined channel of a transmission line in which the transmitting side and the receiving equipment are directly connected with a cable by using an optical cable or a coaxial cable and data may similarly be downloaded on the receiving equipment side. Further, other transmission line such as a telephone line network may be used.

Furthermore, while the storage device and the device connected to the storage device are connected together by the IEEE 1394 format bus line as described above, it is needless to say that they may be connected by data transmission lines of other formats. For example, data can be transmitted in a bidirectional fashion by a radio transmission line capable of similarly transmitting data. When data is transmitted in a wireless fashion, there can be applied a standard called a Bluetooth (Bluetooth), for example.

The invention claimed is:

1. A control method of controlling a second device connected to a first device, comprising:
   receiving a first program inputted to said first device from the outside via content distribution;
   executing the first program to control said first device and initiate a second program prepared beforehand in said first device; and
   executing a second program prepared beforehand in said first device, said second program being operable to select a most desirable device as said second device from among a plurality of devices connected to said first device and to obtain device information for the most desirable device, and said first program is operable to be executed using the device information for the most desirable device.

2. A control method according to claim 1, wherein the execution of said second program selects said second device when information concerning said second device is not stored in a storage unit of said first device.

3. A control method according to claim 1, wherein the execution of said second program selects said second device when a device instructed by information stored in a storage unit of said first device is not connected to said first device.

4. A control method according to claim 1, wherein a storage unit stores device type information for the plurality of devices connected to said first device, and execution of said first or second program is operable to select the most desirable device as said second device based on the device type indicated by said first or second program.

5. A control method according to claim 1, wherein the device information obtained by executing said second program is identification code information corresponding to said second device.

6. A control method according to claim 1, wherein execution of said second program enables said second device to process data, said second device being connected to said first device through a bus line of a predetermined format.

7. A control method according to claim 1, wherein said second program sets information concerning said second device by a predetermined input operation.

8. A control method according to claim 1, wherein said first program is transmitted through predetermined broadcast waves to said first device.

9. A control method according to claim 1, wherein said first program is transmitted through a wired broadcast to said first device.

10. A control method of controlling a second device connected to a first device, comprising:
    receiving a first program inputted to said first device from the outside via content distribution;
    executing the first program to control said first device and initiate a second program prepared beforehand in said first device; and
    executing the second program prepared beforehand in said first device, the second program being operable to select a most desirable device as said second device from among a plurality of devices connected to said first device when executed,
    when control of said second device is ended due to an abnormality, information concerning said second device that was obtained during execution of said second program is stored in a storage unit of said first device and the next time said first device selects a controlled device, said controlled device is selected based upon the information stored in said storage unit.

11. Control equipment, comprising:
    a receiver for receiving a first program inputted to a first device from the outside via content distribution;
    a first storage unit for storing the first program;
    a second storage unit for storing a second program prepared beforehand and which is activated by said first program; and
    a processor that executes said first and second programs stored in said first and second storage units, said second program being operable to select a most desirable device from among a plurality of devices connected to the control equipment and to obtain information for the most desirable device, and
    the most desirable device is operable to be controlled based on the obtained information.

12. Control equipment according to claim 11, wherein said processor selects the most desirable device from the plurality of devices when information of a controlled device is not stored in said second storage unit.

13. Control equipment according to claim 11, wherein said processor selects the most desirable device from other devices among the plurality of devices when a device stored in said second storage unit is not connected as a controlled device.

14. Control equipment according to claim 11, wherein said second storage unit stores device type information for each of the plurality of devices and said processor selects the most desirable device based on the device type indicated by said first or second program.

15. Control equipment according to claim 11, wherein the information obtained for the most desirable device when said processor executes said second program is an identification code corresponding to the most desirable device.

16. Control equipment according to claim 11, further comprising an interface unit for communicating with said processor, wherein said processor obtains the information for the most desirable device through said interface unit and the most desirable device is controlled by said control equipment through said interface unit.

17. Control equipment according to claim 11, further comprising:
an input unit for inputting the information concerning the most desirable device; and
a remote control signal output unit for outputting a remote control signal of a predetermined format in response to a command from said processor, wherein
said processor obtains the information for the most desirable device from said input unit and said processor generates the remote control signal based on the obtained information.

18. Control equipment according to claim 11, further comprising a receiver operable to receive a broadcast signal of a predetermined format, wherein said first program is contained in the broadcast signal and stored in said first storage unit.

19. Control equipment according to claim 18, wherein said receiver receives a satellite broadcast signal relayed by a predetermined satellite.

20. Control equipment according to claim 18, wherein said receiver receives a signal transmitted by a wired broadcast.

21. Control equipment, comprising:
a receiver for receiving a first program inputted to a first device from the outside via content distribution;
a first storage unit for storing the first program;
a second storage unit for storing a second program prepared beforehand and which is activated by said first program; and
a processor in which said first and second programs are executed, said second program is operable to obtain information from a plurality of devices and is operable to select a most desirable device from said plurality of devices, and the most desirable device is operable to be controlled based on the obtained information, and
when control of the most desirable device is ended due to an abnormality, said processor selects the most desirable device the next time said control equipment selects a device to be controlled.

22. The control method according to claim 1, wherein said second program is operable to select a most desirable device as said second device from among a plurality of devices connected to said first device without a selection input from a user.

23. A control method according to claim 22, wherein the execution of said second program selects said second device when information concerning said second device is not stored in a storage unit of said first device.

24. A control method according to claim 22, wherein the execution of said second program selects said second device when a device instructed by information stored in a storage unit of said first device is not connected to said first device.

25. A control method according to claim 22, wherein a storage unit stores device type information for the plurality of devices connected to said first device, and execution of said first or second program is operable to select the most desirable device as said second device based on the device type indicated by said first or second program.

26. A control method according to claim 22, wherein the device information obtained by executing said second program is identification code information corresponding to said second device.

27. A control method according to claim 22, wherein execution of said second program enables said second device to process data, said second device being connected to said first device through a bus line of a predetermined format.

28. A control method according to claim 22, wherein said second program sets information concerning said second device by a predetermined input operation.

29. A control method according to claim 22, wherein said first program is transmitted through predetermined broadcast waves to said first device.

30. A control method according to claim 22, wherein said first program is transmitted through a wired broadcast to said first device.

31. The control method according to claim 10, wherein the second program is operable to select a most desirable device as said second device from among a plurality of devices connected to said first device without a selection input from a user when executed.

32. The control equipment according to claim 11, wherein said second program is operable to select a most desirable device from among a plurality of devices connected to the control equipment without a selection input from a user.

33. Control equipment according to claim 32, wherein said processor selects the most desirable device from the plurality of devices when information of a controlled device is not stored in said second storage unit.

34. Control equipment according to claim 32, wherein said processor selects the most desirable device from other devices among the plurality of devices when a device stored in said second storage unit is not connected as a controlled device.

35. Control equipment according to claim 32, wherein said second storage unit stores device type information for each of the plurality of devices and said processor selects the most desirable device based on the device type indicated by said first or second program.

36. Control equipment according to claim 32, wherein the information obtained for the most desirable device when said processor executes said second program is an identification code corresponding to the most desirable device.

37. Control equipment according to claim 32, further comprising an interface unit for communicating with said processor, wherein said processor obtains the information for the most desirable device through said interface unit and the most desirable device is controlled by said control equipment through said interface unit.

38. Control equipment according to claim 32, further comprising:
- an input unit for inputting the information concerning the most desirable device; and
- a remote control signal output unit for outputting a remote control signal of a predetermined format in response to a command from said processor, wherein
- said processor obtains the information for the most desirable device from said input unit and said processor generates the remote control signal based on the obtained information.

39. Control equipment according to claim 32, further comprising a receiver operable to receive a broadcast signal of a predetermined format, wherein said first program is contained in the broadcast signal and stored in said first storage unit.

40. Control equipment according to claim 39, wherein said receiver receives a satellite broadcast signal relayed by a predetermined satellite.

41. Control equipment according to claim 39, wherein said receiver receives a signal transmitted by a wired broadcast.

42. The control equipment according to claim 21, wherein said second program is operable to select the most desirable device from said plurality of devices without a selection input from a user.

* * * * *